(12) United States Patent
Hirzallah et al.

(10) Patent No.: US 12,689,433 B2
(45) Date of Patent: Jul. 21, 2026

(54) QUASI CO-LOCATION RELATION INDICATION FOR ARTIFICIAL INTELLIGENCE OR MACHINE LEARNING MODELS

(71) Applicant: QUALCOMM Incorporated, San Diego, CA (US)

(72) Inventors: Mohammed Ali Mohammed Hirzallah, San Diego, CA (US); Taesang Yoo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/366,042

(22) Filed: Aug. 7, 2023

(65) Prior Publication Data

US 2025/0055561 A1 Feb. 13, 2025

(51) Int. Cl.
*H04B 7/26* (2006.01)
*H04B 7/06* (2006.01)
*H04L 41/16* (2022.01)

(52) U.S. Cl.
CPC ......... *H04B 7/2693* (2013.01); *H04B 7/0626* (2013.01); *H04L 41/16* (2013.01)

(58) Field of Classification Search
CPC .. H04B 7/2693; H04B 7/0626; H04B 7/0695; H04L 41/16
See application file for complete search history.

(56) References Cited

U.S. PATENT DOCUMENTS

| | | | |
|---|---|---|---|
| 2024/0056833 A1* | 2/2024 | Bai | H04B 7/0632 |
| 2024/0098533 A1* | 3/2024 | Leng | H04W 24/02 |
| 2024/0146480 A1* | 5/2024 | Ghanbarinejad | H04L 5/0051 |
| 2024/0357403 A1* | 10/2024 | Park | H04B 7/0619 |
| 2025/0096966 A1* | 3/2025 | Park | H04L 25/02 |
| 2025/0357982 A1* | 11/2025 | Khan Beigi | H04L 41/16 |

FOREIGN PATENT DOCUMENTS

WO WO-2024030604 A1 * 2/2024 ........... H04B 7/0695

* cited by examiner

*Primary Examiner* — Tejis Daya
(74) *Attorney, Agent, or Firm* — Holland & Hart LLP/Qualcomm

(57) ABSTRACT

Methods, systems, and devices for wireless communications are described. A user equipment (UE) may communicate, with a network entity, an indication of operation of an artificial intelligence (AI) or (ML) model at the UE and/or the network entity. Based on the indication of the operation of the AI or ML model, the UE may communicate, with the network entity, an indication of the QCL relation between the AI or ML model and reference signal communicated by the UE, a physical channel communicated by the UE, an antenna port of the network entity, or an antenna port of the UE. The QCL relation may indicate the radio characteristics applicable to the AI or ML model. The QCL relation may indicate the radio characteristics applicable to the AI or ML model.

30 Claims, 16 Drawing Sheets

130

105

115

Network Entity

Transceiver

1410

Antenna

1415

Communications Manager

1420

Memory

Code

1430

1425

1440

Processor

1435

1405

1400

Figure 15:
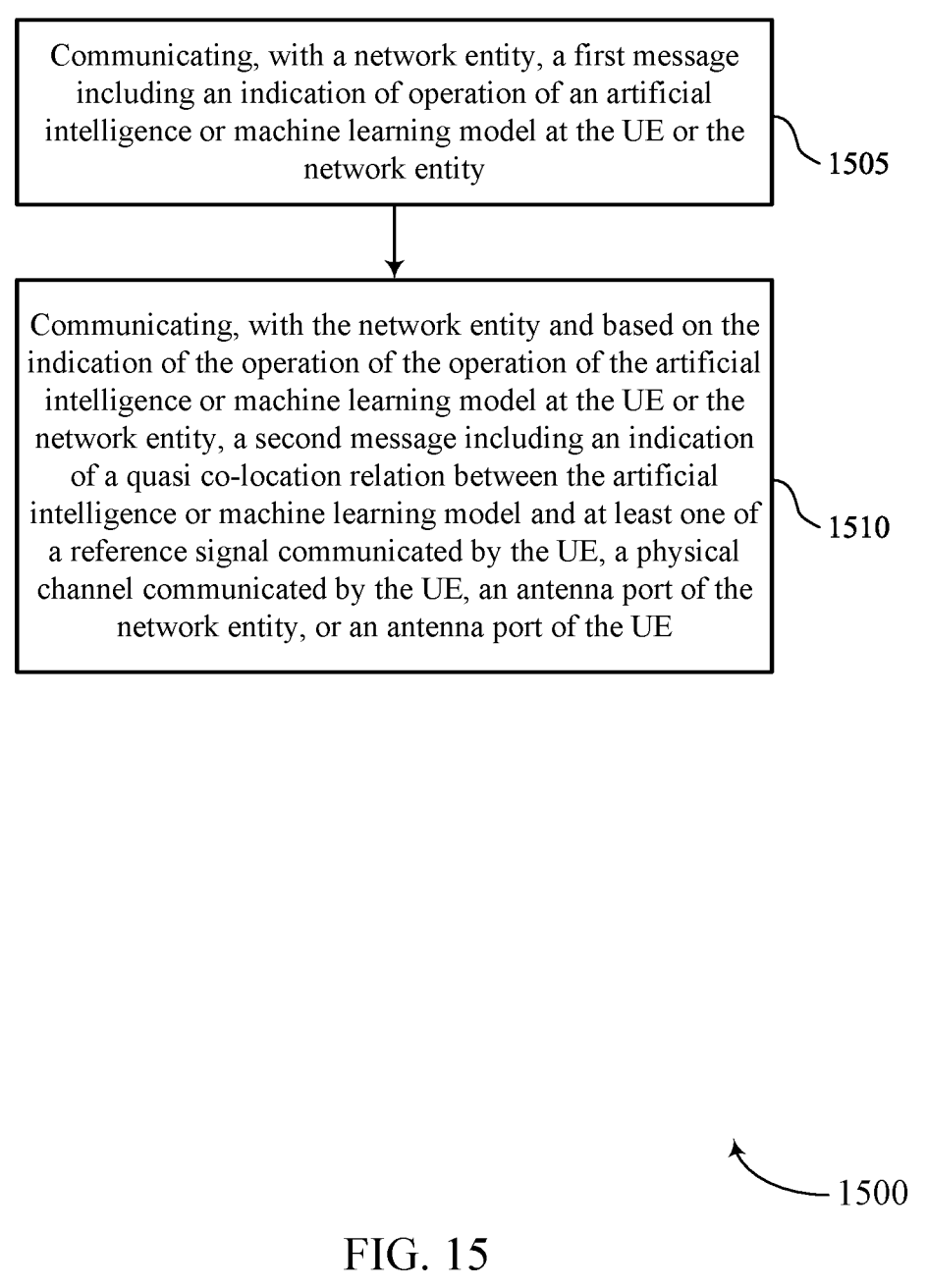

Communicating, with a network entity, a first message including an indication of operation of an artificial intelligence or machine learning model at the UE or the network entity

— 1505

Communicating, with the network entity and based on the indication of the operation of the operation of the artificial intelligence or machine learning model at the UE or the network entity, a second message including an indication of a quasi co-location relation between the artificial intelligence or machine learning model and at least one of a reference signal communicated by the UE, a physical channel communicated by the UE, an antenna port of the network entity, or an antenna port of the UE

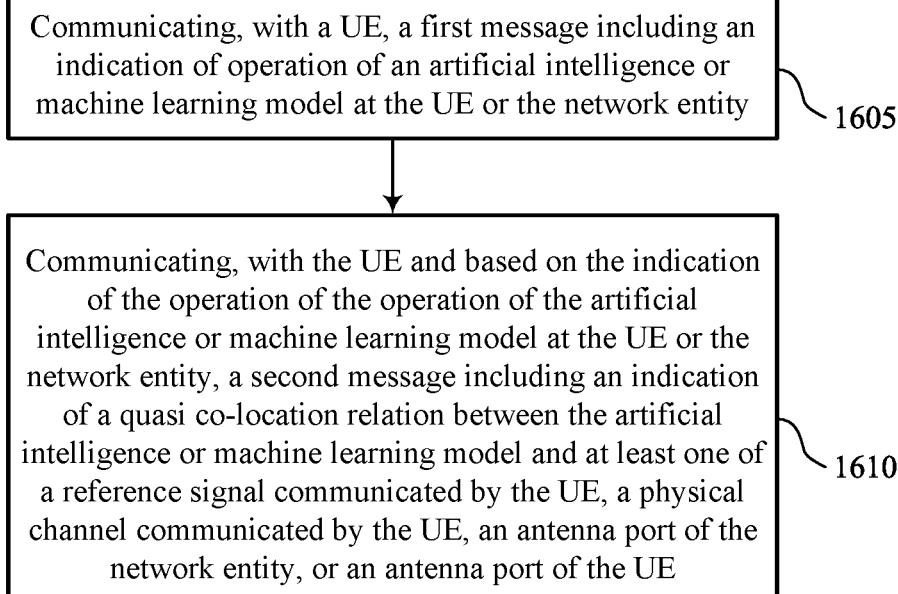

Communicating, with a UE, a first message including an indication of operation of an artificial intelligence or machine learning model at the UE or the network entity

1605

Communicating, with the UE and based on the indication of the operation of the operation of the artificial intelligence or machine learning model at the UE or the network entity, a second message including an indication of a quasi co-location relation between the artificial intelligence or machine learning model and at least one of a reference signal communicated by the UE, a physical channel communicated by the UE, an antenna port of the network entity, or an antenna port of the UE

QUASI CO-LOCATION RELATION INDICATION FOR ARTIFICIAL INTELLIGENCE OR MACHINE LEARNING MODELS

FIELD OF TECHNOLOGY

The following relates to wireless communications, including quasi co-location relation indication for artificial intelligence or machine learning models.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Artificial intelligence (AI) and machine learning (ML) models may be used in wireless communications systems for purposes such as channel state information (CSI) feedback, beam management, or positioning. AI and ML models may be one-sided at a UE or the network, or may be two-sided and operate at both the UE and the network (e.g., an encoder/decoder for channel state information feedback). Some AI and ML models may be specific to certain radio characteristics (e.g., delay spread, Doppler spread, Doppler shift, or spatial relation). Quasi co-location (QCL) relations indicate whether two signals (or functional channels) share common large-scale wireless properties (e.g., avg. delay, delay spread, Doppler shift, Doppler spread) and/or the same receive spatial filter. Transmission configuration indicator (TCI) states may be used to indicate between the network (e.g., a serving network entity) and the UE QCL relations between signals or physical channels.

SUMMARY

The described techniques relate to improved methods, systems, devices, and apparatuses that support quasi co-location (QCL) relation indication for artificial intelligence (AI) or machine learning (ML) models. For example, the described techniques provide for indication, by a user equipment (UE) to a network entity, or by a network entity to a UE, a QCL relation associated with an AI or ML model. The UE may communicate, with the network entity, an indication of the operation of an AI or ML model at the UE and/or the network entity. Based on the indication of the operation of the AI or ML model, the UE may communicate, with the network entity, an indication of the QCL relation between the AI or ML model and reference signal communicated by the UE, a physical channel communicated by the UE, an antenna port of the network entity, or an antenna port of the UE. The QCL relation may indicate the radio characteristics applicable to the AI or ML model.

A method for wireless communications by a user equipment (UE) is described. The method may include communicating, with a network entity, a first message including an indication of operation of an AI or ML model at the UE or the network entity and communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

A UE for wireless communications is described. The UE may include one or more memories storing processor executable code, and one or more processors coupled with the one or more memories. The one or more processors may individually or collectively operable to execute the code to cause the UE to communicating, with a network entity, a first message include an indication of operation of an AI or ML model at the UE or the network entity and communicating, with the network entity and base on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Another UE for wireless communications is described. The UE may include means for communicating, with a network entity, a first message including an indication of operation of an AI or ML model at the UE or the network entity and means for communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

A non-transitory computer-readable medium storing code for wireless communications is described. The code may include instructions executable by a processor to communicating, with a network entity, a first message include an indication of operation of an AI or ML model at the UE or the network entity and communicating, with the network entity and base on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Some examples of the method, UEs, and non-transitory computer-readable medium described herein may further include operations, features, means, or instructions for receiving an indication of a set of transmission configuration indicator (TCI) states, where communicating the second message indicating the QCL relation includes communicating an indication of a TCI state of the set of TCI states that may be associated with the AI or ML model.

In some examples of the method, UEs, and non-transitory computer-readable medium described herein, communicating the first message may include operations, features, means, or instructions for communicating an indication of a configuration including the operation of the AI or ML model at the UE and operation of a second AI or ML model at the network entity, where the second AI or ML model may be complementary to the AI or ML model.

In some examples of the method, UEs, and non-transitory computer-readable medium described herein, communicating the first message may include operations, features, means, or instructions for communicating an indication of a type of AI or ML model of the AI or ML model, where the QCL relation may be based on the type of AI or ML model.

In some examples of the method, UEs, and non-transitory computer-readable medium described herein, communicating the second message may include operations, features, means, or instructions for transmitting the second message via a UE capability exchange with the network entity.

In some examples of the method, UEs, and non-transitory computer-readable medium described herein, communicating the second message may include operations, features, means, or instructions for transmitting the second message via one of an uplink control channel transmission or an uplink shared channel transmission.

In some examples of the method, UEs, and non-transitory computer-readable medium described herein, communicating the second message may include operations, features, means, or instructions for receiving the second message via radio resource control signaling, a downlink control channel transmission, a downlink shared channel transmission, or a medium access control (MAC) control element (MAC-CE).

In some examples of the method, UEs, and non-transitory computer-readable medium described herein, the reference signal may be one of a synchronization signal block, a sounding reference signal, or a channel state information reference signal and the physical channel may be one of a broadcast channel, a downlink control channel, a downlink shared channel, an uplink control channel, or an uplink shared channel.

In some examples of the method, UEs, and non-transitory computer-readable medium described herein, communicating the first message and the second message may include operations, features, means, or instructions for communicating the first message and the second message may be a same control message.

In some examples of the method, UEs, and non-transitory computer-readable medium described herein, communicating the first message and the second message may include operations, features, means, or instructions for communicating the first message via a first control message and communicating the second message via a second control message.

A method for wireless communications by a network entity is described. The method may include communicating, with a UE, a first message including an indication of operation of an AI or ML model at the UE or the network entity and communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

A network entity for wireless communications is described. The network entity may include one or more memories storing processor executable code, and one or more processors coupled with the one or more memories. The one or more processors may individually or collectively operable to execute the code to cause the network entity to communicating, with a UE, a first message include an indication of operation of an AI or ML model at the UE or the network entity and communicating, with the UE and base on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Another network entity for wireless communications is described. The network entity may include means for communicating, with a UE, a first message including an indication of operation of an AI or ML model at the UE or the network entity and means for communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

A non-transitory computer-readable medium storing code for wireless communications is described. The code may include instructions executable by a processor to communicating, with a UE, a first message include an indication of operation of an AI or ML model at the UE or the network entity and communicating, with the UE and base on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Some examples of the method, network entities, and non-transitory computer-readable medium described herein may further include operations, features, means, or instructions for transmitting an indication of a set of TCI states, where communicating the second message indicating the QCL relation includes communicating an indication of a TCI state of the set of TCI states that may be associated with the AI or ML model.

In some examples of the method, network entities, and non-transitory computer-readable medium described herein, communicating the first message may include operations, features, means, or instructions for communicating an indication of a configuration including the operation of the AI or ML model at the UE and operation of a second AI or ML model at the network entity, where the second AI or ML model may be complementary to the AI or ML model.

In some examples of the method, network entities, and non-transitory computer-readable medium described herein, communicating the first message may include operations, features, means, or instructions for communicating an indication of a type of AI or ML model of the AI or ML model, where the QCL relation may be based on the type of AI or ML model.

In some examples of the method, network entities, and non-transitory computer-readable medium described herein, communicating the second message may include operations, features, means, or instructions for receiving the second message via a UE capability exchange with the UE.

In some examples of the method, network entities, and non-transitory computer-readable medium described herein, communicating the second message may include operations, features, means, or instructions for receiving the second message via one of an uplink control channel transmission or an uplink shared channel transmission.

In some examples of the method, network entities, and non-transitory computer-readable medium described herein, communicating the second message may include operations, features, means, or instructions for transmitting the second message via radio resource control signaling, a downlink control channel transmission, a downlink shared channel transmission, or a MAC-CE.

In some examples of the method, network entities, and non-transitory computer-readable medium described herein, the reference signal may be one of a synchronization signal block, a sounding reference signal, or a channel state information reference signal and the physical channel may be one of a broadcast channel, a downlink control channel, a downlink shared channel, an uplink control channel, or an uplink shared channel.

In some examples of the method, network entities, and non-transitory computer-readable medium described herein, communicating the first message and the second message may include operations, features, means, or instructions for communicating the first message and the second message may be a same control message.

In some examples of the method, network entities, and non-transitory computer-readable medium described herein, communicating the first message and the second message may include operations, features, means, or instructions for communicating the first message via a first control message and communicating the second message via a second control message.

BRIEF DESCRIPTION OF THE DRAWINGS

FIGS. 15 and 16 show flowcharts illustrating methods that support QCL relation indication for AI or ML models in accordance with one or more aspects of the present disclosure.

DETAILED DESCRIPTION

Figure 1:
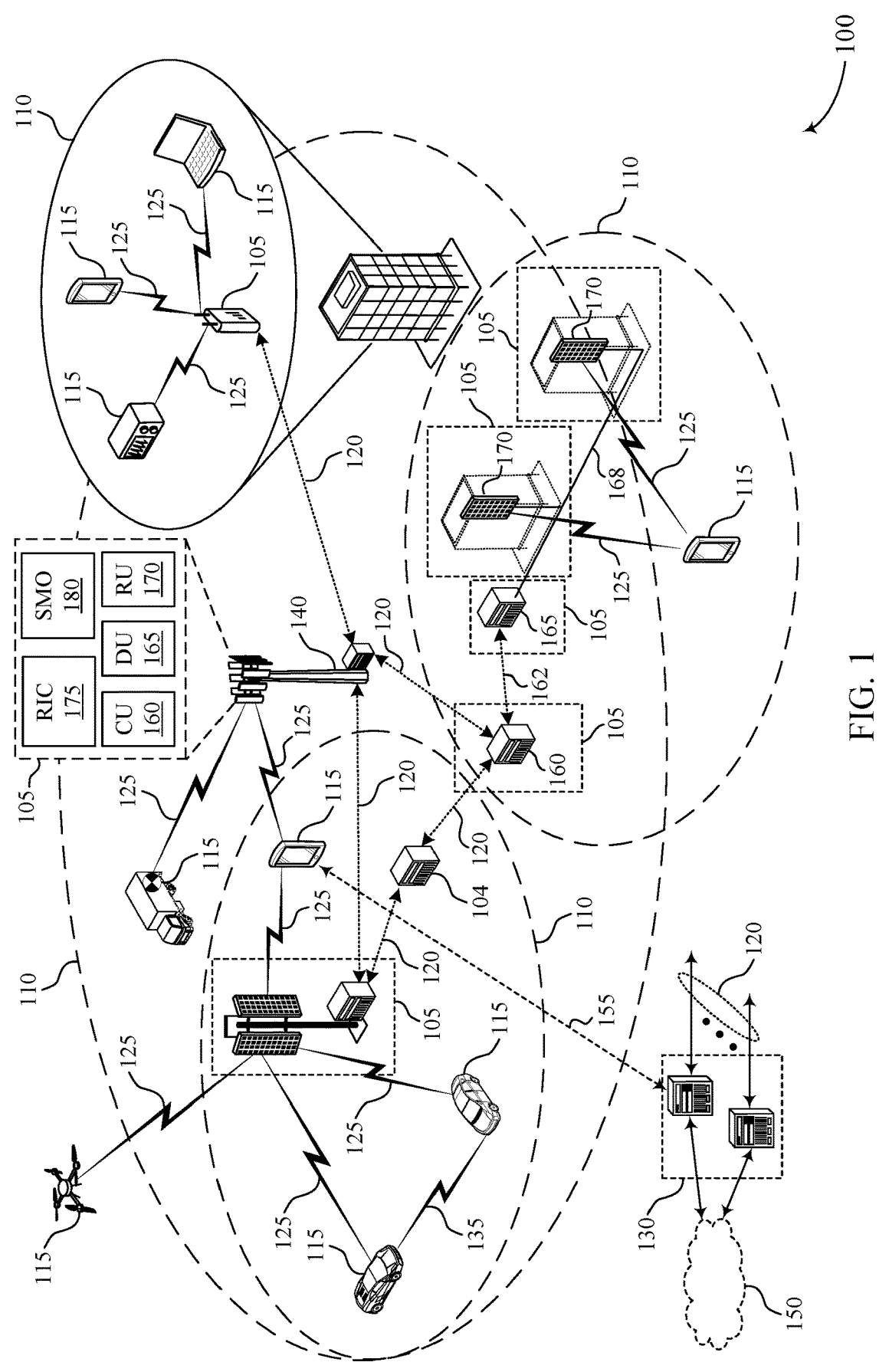
FIG. 1 shows an example of a wireless communications system that supports quasi co-location (QCL) relation indication for artificial intelligence (AI) or machine learning (ML) models in accordance with one or more aspects of the present disclosure.

Various aspects relate generally to wireless communication and more particularly to quasi co-location (QCL) relation indication for artificial intelligence (AI) or machine learning (ML) models. Some aspects more specifically relate to the indication, by a user equipment (UE) to a network entity, or by a network entity to a UE, of a QCL relation between an AI or ML model in operation at the UE and/or the network entity and a reference signal communicated by the UE, a physical channel communicated by the UE, an antenna port of the network entity, or an antenna port of the UE. AI or ML models may refer to AM or ML functionality, an AI or ML physical model, or an AI or ML logical model. In some examples, the UE may communicate, with the network entity, an indication of the operation of an AI or ML model at the UE and/or the network entity. Based on the indication of the operation of the AI or ML model, the UE may communicate, with the network entity, an indication of the QCL relation between the AI or ML model and reference signal communicated by the UE, a physical channel communicated by the UE, an antenna port of the network entity, or an antenna port of the UE. The QCL relation may indicate the radio characteristics applicable to the AI or ML model. In some examples, the QCL relation may be indicated via an indication of a configured transmission configuration indicator (TCI) state. In some examples, the indication of the QCL relation associated with the AI or ML model may be transmitted via layer 1 signaling (e.g., a physical uplink control channel (PUCCH), physical uplink shared channel (PUSCH), physical downlink control channel (PDCCH), or physical downlink shared channel (PDSCH) transmission), layer 2 signaling (e.g., a medium access control (MAC) control element (CE)), or layer 3 signaling (e.g., radio resource control (RRC) or UE capability signaling).

Particular aspects of the subject matter described in this disclosure can be implemented to realize one or more of the following potential advantages. AI and ML models may be specific to certain radio characteristics (e.g., delay spread, Doppler spread, Doppler shift, or spatial relation). Accordingly, the QCL relation indicated to the receiving device indicates the radio characteristics applicable to the AI or ML model. Information regarding the applicable radio characteristics for a AI or ML model may enable the receiving device to train or apply AI or ML models using current and/or pertinent environmental conditions. Using a QCL relation to indicate applicable radio characteristics may involve less signaling overhead than explicitly indicating a range of radio characteristics applicable to an AI or ML model.

Aspects of the disclosure are initially described in the context of wireless communications systems. Aspects of the disclosure are further illustrated by and described with reference to QCL relation diagrams, ML processes, process flows, apparatus diagrams, system diagrams, and flowcharts that relate to QCL relation indication for AI or ML models.

FIG. 1 shows an example of a wireless communications system 100 that supports QCL relation indication for AI or ML models in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support QCL relation indication for AI or ML models as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may use AI or ML models for purposes such as CSI feedback, beam management, or positioning. AI and ML models may be one-sided at a UE 115 or a network entity 105, or may be two-sided and operate at both the UE 115 and the network entity 105 (e.g., an encoder/decoder for CSI feedback). AI or ML models may be trained at the UE side or the network side. AI or ML models may learn solutions that map to specific radio characteristics and site-specific features. For example, AI and ML models may be specific to certain radio characteristics (e.g., delay spread, Doppler spread, Doppler shift, or spatial relation). Mapping an explicit indication of a range of radio characteristics that are applicable to an AI or ML model (e.g., area information for which the AI or ML model is applicable) may be cumbersome and/or may involve extensive signaling between the UE 115 and the network. For example, a UE 115 may be positioned in a vehicle driving between cells in a dynamically changing environment. As described herein, as compared to an explicit indication of the range of radio characteristics that are applicable to an AI or ML model, QCL relation information may provide a quick and efficient way to signal the applicability of an AI or ML model between a UE 115 and a network entity 105.

A QCL relation indicates whether two signals (or functional channels) share common large-scale wireless properties (e.g., avg. delay, delay spread, Doppler shift, Doppler spread) and/or the same receive spatial filter (e.g., received from the same direction). QCL relation information may be used to describe whether two antenna ports that relate to physical channels and/or reference signals experience common large-scale wireless properties and/or spatial receive relation. Therefore, a UE 115 may use QCL relation information for channel estimation and beam operation for different types of physical channels and symbols. Several types of QCL relations may be supported. Reference signals, physical channels, or antenna ports have a QCL Type A relation if the reference signals, physical channels, or antenna ports share a common average delay, delay spread, Doppler shift, and Doppler spread. For example, downlink reference signals may include CSI reference signals (CSI-RSs) and synchronization signal blocks (SSBs). Reference signals, physical channels, or antenna ports have a QCL Type B relation if the reference signals, physical channels, or antenna ports share a common Doppler shift and Doppler spread. Reference signals, physical channels, or antenna ports have a QCL Type C relation if the reference signals, physical channels, or antenna ports share a common average delay and Doppler shift. Reference signals, physical channels, or antenna ports have a QCL Type D relation if the reference signals, physical channels, or antenna ports share a common spatial receive relation.

TCI states may be used by network (e.g., a serving network entity 105) to indicate QCL relations of physical channels and/or reference signals to a UE 115. A TCI state identifier (ID) may be used to configure and indicate a TCI state. A UE 115 may be updated with TCI state IDs through RRC configurations. For example, an information element (IE) tci-StatesToAddModList in an RRC Reconfig message may include a table of TCI states. The table may include one or more TCI state IDs (e.g., tci-StateID) and may indicate one or more QCL types for an applicable BWP and source reference signal for each TCI state ID. For example, Table 1 shows an example TCI table entry which may be included in the tci-StatesToAddModList IE. An RRC Reconfig message may include an IE tci-StatesPDCCH-ToAddList, which may indicate a subset of the defined TCI states and may be used to provide QCL relationships between downlink reference signals and PDCCH demodulation reference signal (DMRS) ports. An RRC Reconfig message may include an IE spatialRelationInfo, which may indicate a configuration of the spatial relation between a source reference signal and a target reference signal (e.g., a sounding reference signal (SRS)). An RRC Reconfig message may include an IE qcl-InfoPeriodicCSI-RS, which for a target periodic CSI-RS, contains a reference to a TCI state of the defined TCI states and provides a source reference signal and QCL type for the target periodic CSI-RS. An RRC Reconfig message may include an IE pucch-SpatialRelationInfold, which may be used to configure the spatial setting for PUCCH transmission(s). Changes in TCI states may be signaled through MAC-CE and/or downlink control information (DCI) signaling.

TABLE 1

| TCI State ID | Downlink reference signal 1 | QCL Type 1 | Downlink reference signal 2 | QCL Type 2 |
|---|---|---|---|---|
| 1 | SSB-1 | QCL-Type-A | CSI-RS-1 | QCL-Type-D |
| 2 | SSB-2 | QCL-Type-B | CSI-RS-3 | QCL-Type-D |
| 3 | SSB-5 | QCL-Type-C | CSI-RS-6 | QCL-Type-D |

A UE 115 may indicate to a network entity 105, or the network entity 105 may indicate to the UE 115, a QCL relation for an AI or ML model. The AI or ML model may run at the UE 115, the network entity 105, or both (e.g., a paired or two-sided model). The UE 115 and the network entity 105 may indicate operation of the AI or ML model at one or both of the UE 115 and the network entity 105, and may indicate the applicable QCL relation for the AI or ML model. As described herein, indication of QCL relation information may be a fast and low overhead way to indicate source reference signals or antenna ports. The QCL relation indicates the radio characteristics applicable to the AI or ML model. Thus, indication of QCL relation information for AI or ML models may be a fast and efficient way to perform AI or ML model life cycle management. In some examples, the QCL relation associated with the AI or ML model may be indicated as a TCI state. The indication of the QCL relation associated with the AI or ML model may be transmitted via layer 1 signaling (e.g., a PUCCH, PUSCH, PSDCH, or PDCCH transmission), layer 2 signaling (e.g., a MAC-CE), or layer 3 signaling (e.g., RRC or UE capability signaling). How QCL relations between an AI or ML model and reference signal or physical channel are derived may be implementation specific (e.g., may be the same for QCL in antenna ports). Once a UE 115 and network entity 105 exchange QCL relation information, how the QCL relation information is used for AI or ML model like cycle management (LCM) (e.g., activation, deactivation, selection, switching, falling back) may be implementation specific.

Figure 2:
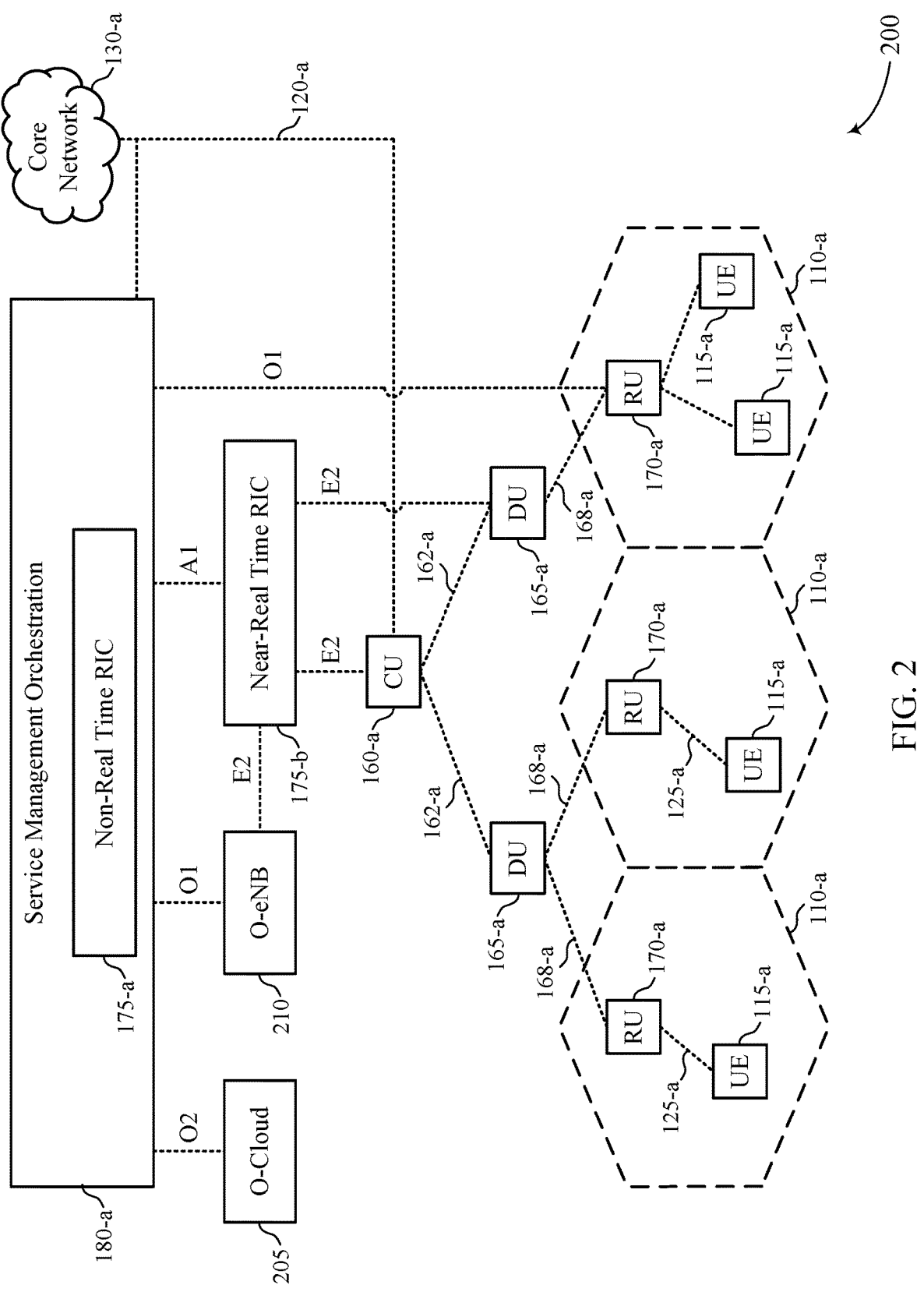
FIG. 2 shows an example of a network architecture that supports QCL relation indication for AI or ML models in accordance with one or more aspects of the present disclosure.

FIG. 2 shows an example of a network architecture 200 (e.g., a disaggregated base station architecture, a disaggregated RAN architecture) that supports QCL relation indication for AI or ML models in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*. RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, AI or ML workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via 01) or via generation of RAN management policies (e.g., AI policies).

In some examples, as described herein, a CU 160-a, a DU 165-a, and/or the a UE 115-a may operate AI or ML models for purposes such as CSI feedback, beam management, or positioning. AI and ML models may be one-sided at a UE 115-a or the network (e.g., the CU 160-a or the DU 165-a) or may be two-sided and operate at both the UE 115 and the network. AI or ML models may be trained at the UE side or the network side. The UE 115-a and the network (e.g., the CU 160-a or the DU 165-a) may communicate an indication of a QCL relation associated with the AI or ML model, which may be used for LCM of the AI or ML model.

Figure 3:
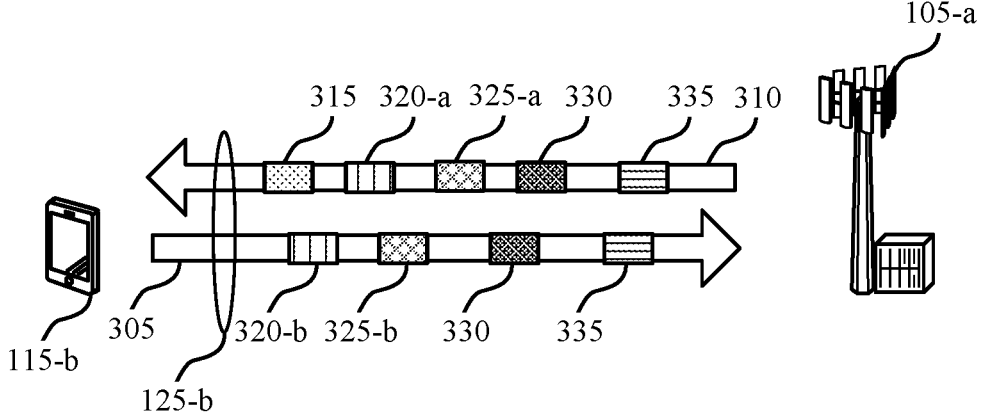
FIG. 3 shows an example of a wireless communications system that supports QCL relation indication for AI or ML models in accordance with one or more aspects of the present disclosure.

FIG. 3 shows an example of a wireless communications system 300 that supports QCL relation indication for AI or ML models in accordance with one or more aspects of the present disclosure. The wireless communications system 300 may implement or may be implemented by aspects of the wireless communications system 100 or the network architecture 200. For example, the wireless communications system 300 may include a UE 115-b, which may be an example of a UE 115 as described herein. The wireless communications system 300 may include a network entity 105-a, which may be an example of a network entity 105 as described herein.

The UE 115-b may communicate with the network entity 105-a using a communication link 125-b. The communication link 125-b may be an example of an NR or LTE link between the UE 115-b and the network entity 105-a. The communication link 125-b may include a bi-directional link that enables both uplink and downlink communications. For example, the UE 115-b may transmit uplink signals 305 (e.g., uplink transmissions), such as uplink control signals or uplink data signals, to the network entity 105-a using the communication link 125-b and the network entity 105-a may transmit downlink signals 310 (e.g., downlink transmissions), such as downlink control signals or downlink data signals, to the UE 115-b using the communication link 125-b.

In some examples, the network entity 105-a may transmit a TCI state configuration message 315 to the UE 115-b that configures a set of TCI states. For example, the TCI state configuration message 315 may be an RRC Reconfig message as described herein. As described herein, the network entity 105-a may update TCI states via RRC, MAC-CE, or DCI signaling. In some examples, the network entity 105-a may transmit one or more reference signals 320-a (e.g., CSI-RSs or SSBs) which may be received by the UE 115-b. In some examples, the UE 115-b may transmit one or more reference signals 320-b (e.g., SRSs) which may be received by the network entity 105-a. The TCI states may indicate the reference signals 320-a and/or the reference signals 320-b as source reference signals. In some examples, the network entity 105-a may transmit one or more physical channel transmissions 325-a (e.g., a PDCCH or PDSCH transmission) to the UE 115-b. In some examples, the UE 115-b may transmit one or more physical channel transmissions 325-a (e.g., a PUCCH or PUSCH transmission) to the network entity 105-a.

As described herein, the UE 115-b and/or the network entity 105-a may operate AI or ML model(s) for purposes such as CSI feedback, beam management, or positioning. AI and ML models may be one-sided at the UE 115-b or the network entity 105-a, or may be two-sided and operate at both the UE 115-b and the network entity 105-a (e.g., an encoder/decoder for CSI feedback). In some examples, the network entity 105-a may be any of a gNB, a CU 160, a DU 165, or a cell as described herein, and accordingly, an AI or ML model may be operating at any of the gNB, the CU 160, the DU 165, or the cell.

In some examples, the UE 115-b may transmit a message 330 to the network entity 105-a indicating that the UE 115-b is operating an AI or ML model. In some examples, the network entity 105-a may transmit the message 330 to the UE 115-b indicating that the network entity 105-a is operating an AI or ML model. In some examples, the network entity 105-a may transmit the message 330 to the UE 115-b, and the message 330 may configure the AI or ML model for the UE 115-b. As described herein, based on the indication that the UE 115-b and/or or the network entity 105-a is operating an AI or ML model (e.g., via the message 330), the UE 115-b and the network entity 105-a may communicate a message 335 that indicates a QCL relation between the AI or ML model and a reference signal (e.g., one of the reference signals 320-a or the reference signals 320-b) communicated by the UE 115-b, a physical channel communicated by the UE 115-b (e.g., one of the physical channels used to transmit the physical channel transmissions 325-a or the physical channel transmissions 325-b), an antenna port of the network entity 105-a, or an antenna port of the UE 115-b (e.g., an antenna port used to transmit or receive a reference signal or physical channel). In some examples, the QCL relation indicated by the message 335 may be indicated via indication of a TCI state of the set of configured TCI states.

For example, the UE 115-b may indicate via the message 335 to the network entity 105-a a QCL relation between an AI model and a reference point. The network entity 105-a may use the indicated QCL relation to further apply model LCM (e.g., activation, deactivation, selection, switching, or fallback) for the AI or ML model. The reference point may be a reference signal, antenna port, or physical channel (e.g., physical broadcast channel (PBCH), PDSCH, PDCCH, PUCCH, PUSCH) which is transmitted by the UE 115-b (e.g., one of the reference signals 320-b, the physical channel used to transmit the physical channel transmission 325-b, or an antenna port at the UE 115-b used to transmit or an antenna port at the network entity 105-a used to receive the reference signals 320-b or physical channel transmission 325-b) or received by the UE 115-b (e.g., one of the reference signals 320-a, the physical channel used to receive the physical channel transmission 325-a, or an antenna port at the UE 115-b used to receive or an antenna port at the network entity 105-a used to transmit the reference signals 320-a or physical channel transmission 325-a). As described herein, the AI or ML model may be running at the UE 115-b, the network entity 105-a, or may be a paired or two sided model (e.g., a portion of the AI or ML model running at the UE 115-b while another portion is running at the network entity 105-*a*). The QCL relation indicated in the message 335 may show an equivalency or similarity type between the AI or ML model and one of the characteristics of the reference point (e.g., one of a QCL Type A, QCL Type B, QCL Type C, or QCL Type D relation). When the message 335 is transmitted from the UE 115-*b* to the network entity 105-*a*, the message 335 may be transmitted as part of a UE capability exchange (e.g., as a component or conditional part of an AI or ML model feature or feature group), via a PUCCH transmission, or via a PUSCH transmission. In some examples, the message 335 and the message 330 may be transmitted in a same control message (e.g., in the same UE capability exchange message, the same PUCCH transmission, or the same PUSCH transmission). In some examples, the message 335 may be transmitted in response to a request from the network entity 105-*a* (e.g., after transmission of the message 330).

As another example, the network entity 105-*a* may indicate via the message 335 to the UE 115-*b* a QCL relation between an AI model and a reference point. The UE 115-*b* may use the indicated QCL relation to further apply model LCM (e.g., activation, deactivation, selection, switching, or fallback) for the AI or ML model. The reference point may be a reference signal, antenna port, or physical channel (e.g., physical broadcast channel (PBCH), PDSCH, PDCCH, PUCCH, PUSCH) which is transmitted by the UE 115-*b* (e.g., one of the reference signals 320-*b*, the physical channel used to transmit the physical channel transmission 325-*b*, or an antenna port at the UE 115-*b* used to transmit or an antenna port at the network entity 105-*a* used to receive the reference signals 320-*b* or physical channel transmission 325-*b*) or received by the UE 115-*b* (e.g., one of the reference signals 320-*a*, the physical channel used to receive the physical channel transmission 325-*a*, or an antenna port at the UE 115-*b* used to receive or an antenna port at the network entity 105-*a* used to transmit the reference signals 320-*a* or physical channel transmission 325-*a*). As described herein, the AI or ML model may be running at the UE 115-*b*, the network entity 105-*a*, or may be a paired or two sided model (e.g., a portion of the AI or ML model running at the UE 115-*b* while another portion is running at the network entity 105-*a*). The QCL relation indicated in the message 335 may show an equivalency or similarity type between the AI or ML model and one of the characteristics of the reference point (e.g., one of a QCL Type A, QCL Type B, QCL Type C, or QCL Type D relation). When the message 335 is transmitted from the network entity 105-*a* to the UE 115-*b*, the message 335 may be transmitted as part of an RRC configuration, via a PDCCH transmission, via a PDSCH transmission, via a MAC-CE, or via a DCI. In some examples, the message 335 and the message 330 may be transmitted in a same control message (e.g., in the same RRC message, the same PDCCH transmission, the same PDSCH transmission, the same MAC-CE, or the same DCI). In some examples, the message 335 may be transmitted in response to a request from the UE 115-*b* (e.g., after transmission of the message 330).

Figure 4:
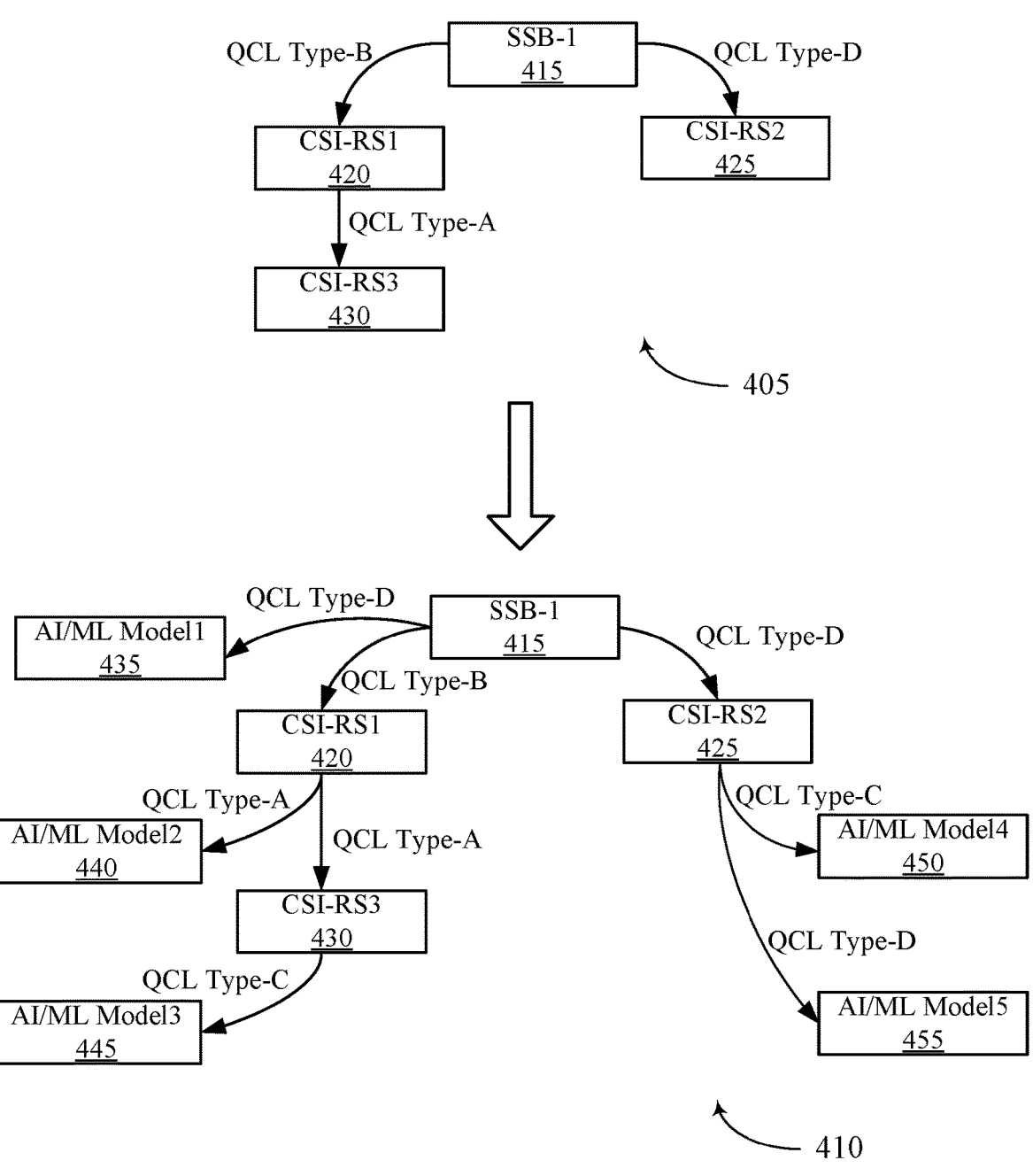
FIG. 4 shows an example of a QCL relation diagram that supports QCL relation indication for AI or ML models in accordance with one or more aspects of the present disclosure.

FIG. 4 shows an example of a QCL relation diagram 400 that supports QCL relation indication for AI or ML models in accordance with one or more aspects of the present disclosure. The QCL relation diagram 400 may implement or may be implemented by aspects of the wireless communications system 100, the network architecture 200, or the wireless communications system 300.

As described herein, QCL relation information may indicate common large-scale wireless properties shared by reference signals and/or physical channels. The first example 405 of the QCL relation diagram 400 shows a scenario where the SSB-1 415 is indicated as having a QCL Type B relation with the CSI-RS1 420, the SSB-1 415 is indicated as having a QCL Type D relation with the CSI-RS2 425, and the CSI-RS1 420 is indicated as having a QCL Type A relation with the CSI-RS3 430.

As described herein, an AI or ML model may have a QCL relation with a reference signal, physical channel, or antenna port. The second example 410 of the QCL relation diagram 400 shows another scenario where the SSB-1 415 is indicated as having a QCL Type B relation with the CSI-RS1 420, the SSB-1 415 is indicated as having a QCL Type D relation with the CSI-RS2 425, and the CSI-RS1 420 is indicated as having a QCL Type A relation with the CSI-RS3 430. Further, in the second example 410, the AI/ML model-1 435 has a QCL Type D relation with the SSB-1 415, the AI/ML model-2 440 has a QCL Type A relation with the CSI-RS1 420, the AI/ML model-3 445 has a QCL Type C relation with the CSI-RS3 430, the AI/ML model-4 450 has a QCL Type C relation with the CSI-RS2 425, and the AI/ML model-5 455 has a QCL Type D relation with the CSI-RS2 425. Accordingly, a UE 115 or network entity 105 may use the QCL relation information to perform LCM for the AI/ML models.

Figure 5:
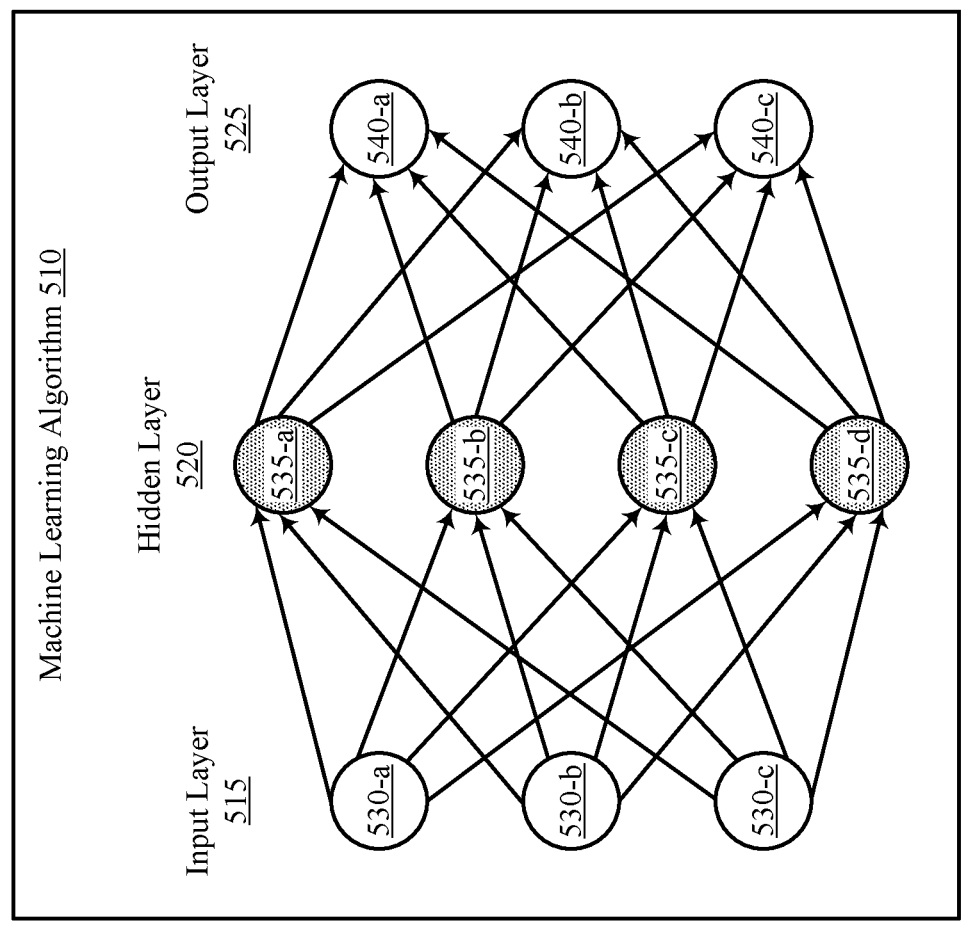
FIG. 5 shows an example of a ML process that supports QCL relation indication for AI or ML models in accordance with one or more aspects of the present disclosure.

FIG. 5 shows an example of a ML process 500 that supports QCL relation indication for AI or ML models in accordance with one or more aspects of the present disclosure. The ML process 500 may implement or may be implemented by aspects of the wireless communications system 100, the network architecture 200, or the wireless communications system 300. For example, the ML process 500 may be implemented at a network entity 105, a UE 115, or both, as described with reference to FIGS. 1 through 4. For example, the ML process 500 may be an AI or ML model used for CSI feedback, beam management, or positioning as described herein.

The ML process 500 may include a ML algorithm 510. As illustrated, the ML algorithm 510 may be an example of a neural network, such as a feed forward (FF) or deep feed forward (DFF) neural network, a recurrent neural network (RNN), a long/short term memory (LSTM) neural network, or any other type of neural network. However, any other ML algorithms may be supported. For example, the ML algorithm 510 may implement a nearest neighbor algorithm, a linear regression algorithm, a Naïve Bayes algorithm, a random forest algorithm, or any other ML algorithm. Furthermore, the ML process 500 may involve supervised learning, unsupervised learning, semi-supervised learning, reinforcement learning, or any combination thereof.

The ML algorithm 510 may include an input layer 515, one or more hidden layers 520, and an output layer 525. In a fully connected neural network with one hidden layer 520, each hidden layer node 535 may receive a value from each input layer node 530 as input, where each input may be weighted. These neural network weights may be based on a cost function that is revised during training of the ML algorithm 510. Similarly, each output layer node 540 may receive a value from each hidden layer node 535 as input, where the inputs are weighted. If post-deployment training (e.g., online training) is supported, memory may be allocated to store errors and/or gradients for reverse matrix multiplication. These errors and/or gradients may support updating the ML algorithm 510 based on output feedback. Training the ML algorithm 510 may support computation of the weights (e.g., connecting the input layer nodes 530 to the hidden layer nodes 535 and the hidden layer nodes 535 to the output layer nodes 540) to map an input pattern to a desired output outcome. This training may result in a device-specific ML algorithm 510 based on the historic application data and data transfer for a specific network entity 105 or UE 115.

In some examples, input values 505 may be sent to the ML algorithm 510 for processing. In some examples, pre-processing may be performed according to a sequence of operations on the input values 505 such that the input values 505 may be in a format that is compatible with the ML algorithm 510. The input values 505 may be converted into a set of k input layer nodes 530 at the input layer 515. In some cases, different measurements may be input at different input layer nodes 530 of the input layer 515. Some input layer nodes 530 may be assigned default values (e.g., values of 0) if the number of input layer nodes 530 exceeds the number of inputs corresponding to the input values 505. As illustrated, the input layer 515 may include three input layer nodes 530-a, 530-b, and 530-c. However, it is to be understood that the input layer 515 may include any number of input layer nodes 530 (e.g., 20 input nodes).

The ML algorithm 510 may convert the input layer 515 to a hidden layer 520 based on a number of input-to-hidden weights between the k input layer nodes 530 and the n hidden layer nodes 535. The ML algorithm 510 may include any number of hidden layers 520 as intermediate steps between the input layer 515 and the output layer 525. Additionally, each hidden layer 520 may include any number of nodes. For example, as illustrated, the hidden layer 520 may include four hidden layer nodes 535-a, 535-b, 535-c, and 535-d. However, it is to be understood that the hidden layer 520 may include any number of hidden layer nodes 535 (e.g., 10 input nodes). In a fully connected neural network, each node in a layer may be based on each node in the previous layer. For example, the value of hidden layer node 535-a may be based on the values of input layer nodes 530-a, 530-b, and 530-c (e.g., with different weights applied to each node value).

The ML algorithm 510 may determine values for the output layer nodes 540 of the output layer 525 following one or more hidden layers 520. For example, the ML algorithm 510 may convert the hidden layer 520 to the output layer 525 based on a number of hidden-to-output weights between the n hidden layer nodes 535 and the m output layer nodes 540. In some cases, n=m. Each output layer node 540 may correspond to a different output value 545 of the ML algorithm 510. As illustrated, the ML algorithm 510 may include three output layer nodes 540-a, 540-b, and 540-c, supporting three different threshold values. However, it is to be understood that the output layer 525 may include any number of output layer nodes 540. In some examples, post-processing may be performed on the output values 545 according to a sequence of operations such that the output values 545 may be in a format that is compatible with reporting the output values 545.

Figure 6:
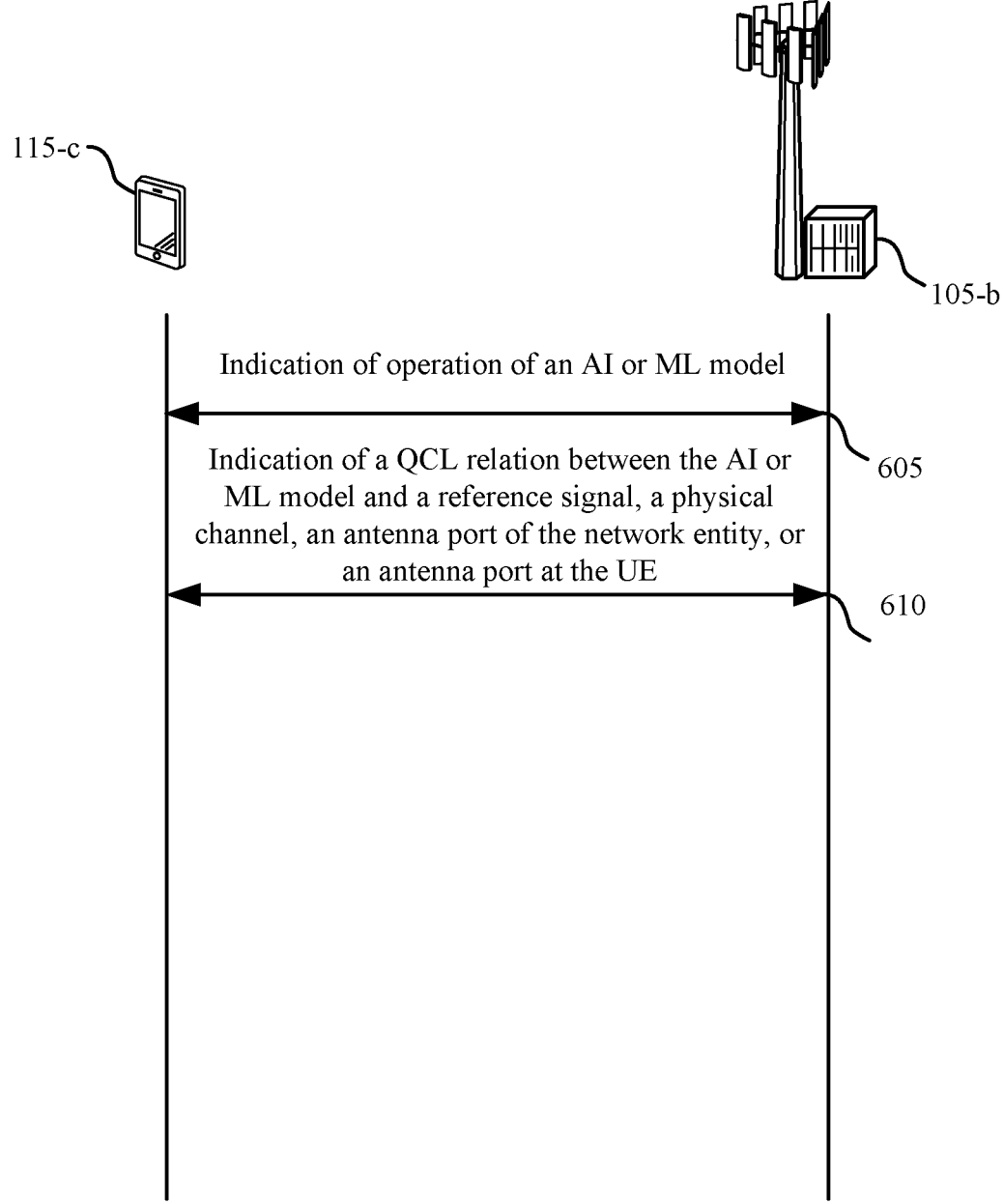
FIG. 6 shows an example of a process flow that supports QCL relation indication for AI or ML models in accordance with one or more aspects of the present disclosure.

FIG. 6 shows an example of a process flow 600 that supports QCL relation indication for AI or ML models in accordance with one or more aspects of the present disclosure. The process flow 600 may include a UE 115-c, which may be an example of a UE 115 as described herein. The process flow 600 may include a network entity 105-b, which may be an example of a network entity 105 as described herein. In the following description of the process flow 600, the operations between the network entity 105-b and the UE 115-c may be transmitted in a different order than the example order shown, or the operations performed by the network entity 105-b and the UE 115-c may be performed in different orders or at different times. Some operations may also be omitted from the process flow 600, and other operations may be added to the process flow 600.

At 605, the UE 115-c may communicate, with the network entity 105-b, a first message including an indication of operation of an AI or ML model at the UE 115-c or the network entity 105-b. In some examples, the UE 115-c and the network entity 105-b may communicate an indication of a configuration of a complementary (e.g., paired or two-sided) AI or ML model operating at the UE 115-c and the network entity 105-b.

At 610, the UE 115-c may communicate, with the network entity 105-b and based on the indication of the operation of the operation of the AI or ML model at the UE 115-c or the network entity 105-b, a second message including an indication of a QCL relation between the AI or ML model and at least one of a reference signal communicated by the UE 115-c, a physical channel communicated by the UE 115-c, an antenna port of the network entity 105-b, or an antenna port of the UE 115-c.

In some examples, the network entity 105-b may transmit, to the UE 115-c, an indication of a set of TCI states. In such examples, at 610, the UE 115-c may indicate the QCL relation via indicating one of the indicated set of TCI states.

In some examples, the UE 115-c may communicate, with the network entity 105-b, an indication of a type of AI or ML model of the AI or ML model. For example, the type of AI or ML model may be an AI or ML model used for CSI feedback, beam management, or positioning. In such examples, the QCL relation may be based on the type of AI or ML model. For example, for an AI or ML model type used for CSI feedback, QCL relation with respect to CSI-RSs may be selected.

In some examples, the UE 115-c may communicate the second message at 610 via a UE capability exchange with the network entity 105-b.

In some examples, the UE 115-c may transmit the second message at 610 via one of an uplink control channel transmission or an uplink shared channel transmission.

In some examples, the network entity 105-b may transmit the second message at 610 via RRC, a downlink control channel transmission, a downlink shared channel transmission, or a MAC-CE.

In some examples, the reference signal communicated by the UE 115-c is one of a synchronization signal block, a sounding reference signal, or a channel state information reference signal. In some examples, the physical channel communicated by the UE 115-c is one of a broadcast channel, a downlink control channel, a downlink shared channel, an uplink control channel, or an uplink shared channel.

In some examples, the first message at 605 and the second message at 610 may be communicated in a same control message (e.g., a same UE capability message, a same RRC message, a same PDCCH transmission, a same PDSCH transmission, a same MAC-CE, a same PDSCH message, or a same PUSCH message). In some examples, the first message at 605 may be communicated in a first control message and the second message at 610 may be communicated in a second control message.

Figure 7:
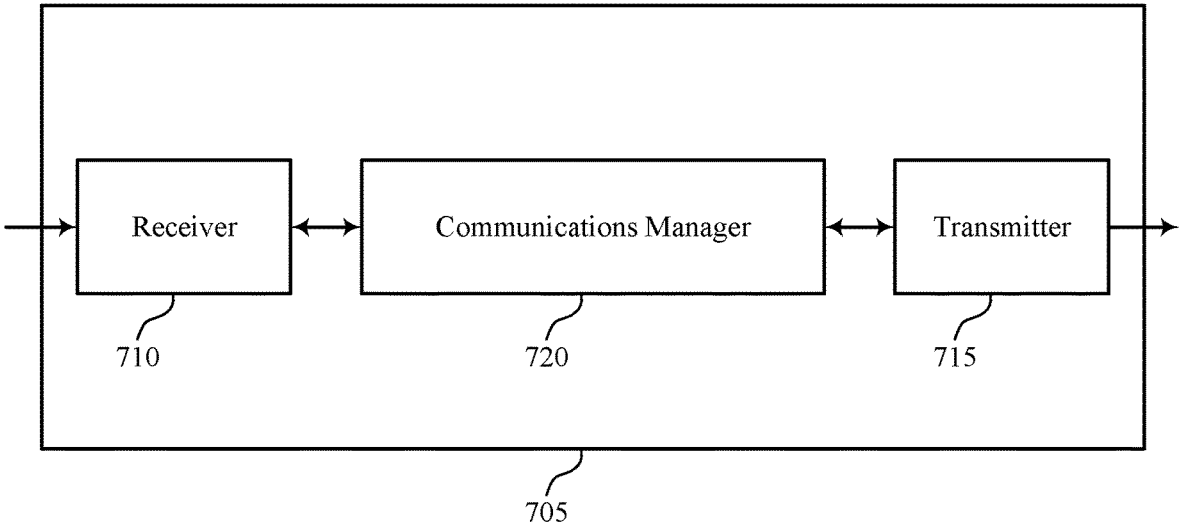
FIGS. 7 and 8 show block diagrams of devices that support QCL relation indication for AI or ML models in accordance with one or more aspects of the present disclosure.

FIG. 7 shows a block diagram 700 of a device 705 that supports QCL relation indication for AI or ML models in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to QCL relation indication for AI or ML models). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to QCL relation indication for AI or ML models). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of QCL relation indication for AI or ML models as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for communicating, with a network entity, a first message including an indication of operation of an AI or ML model at the UE or the network entity. The communications manager 720 is capable of, configured to, or operable to support a means for communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for more efficient utilization of communication resources.

Figure 8:
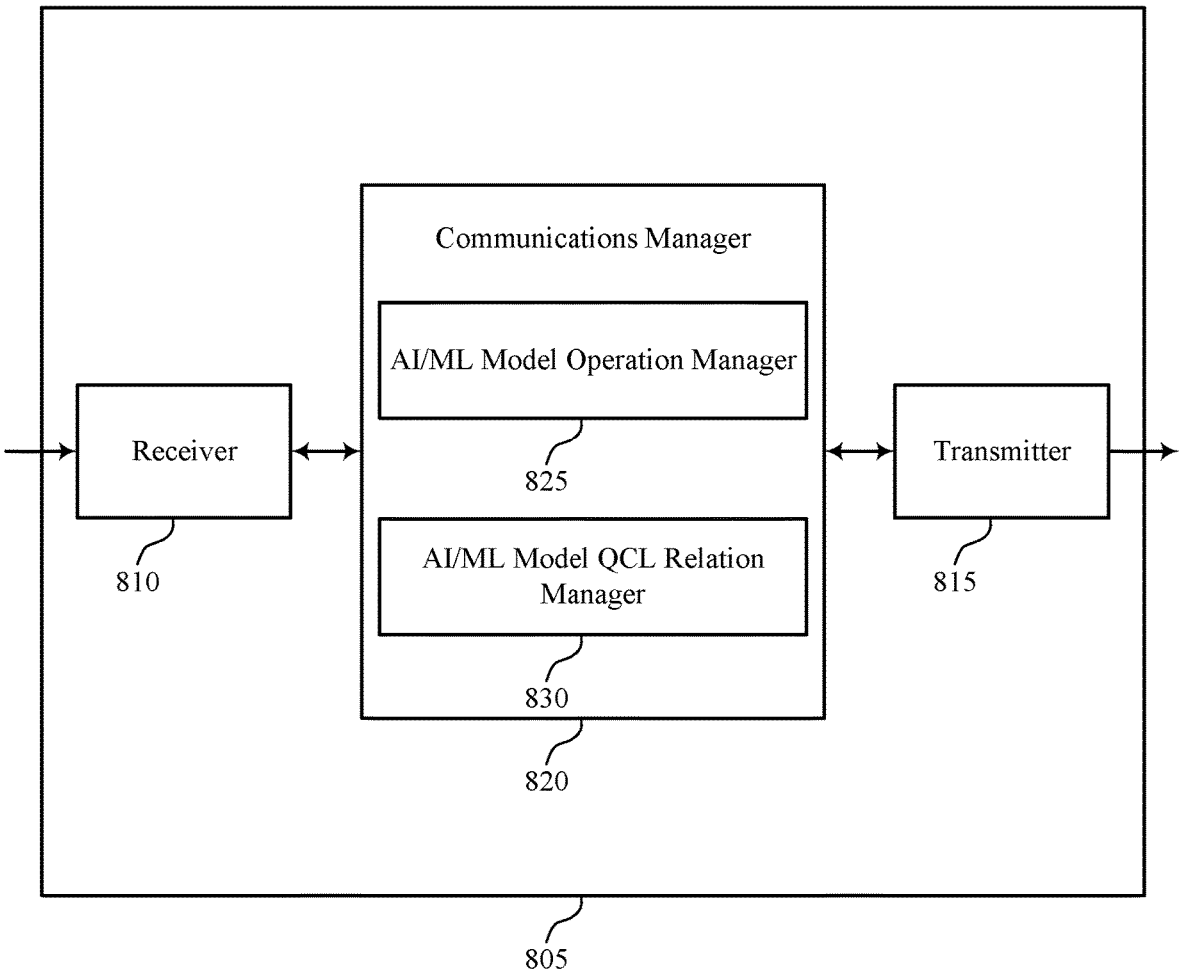

FIG. 8 shows a block diagram 800 of a device 805 that supports QCL relation indication for AI or ML models in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to QCL relation indication for AI or ML models). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to QCL relation indication for AI or ML models). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of QCL relation indication for AI or ML models as described herein. For example, the communications manager 820 may include an AI/ML model operation manager 825 an AI/ML model QCL relation manager 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The AI/ML model operation manager 825 is capable of, configured to, or operable to support a means for communicating, with a network entity, a first message including an indication of operation of an AI or ML model at the UE or the network entity. The AI/ML model QCL relation manager 830 is capable of, configured to, or operable to support a means for communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Figure 9:
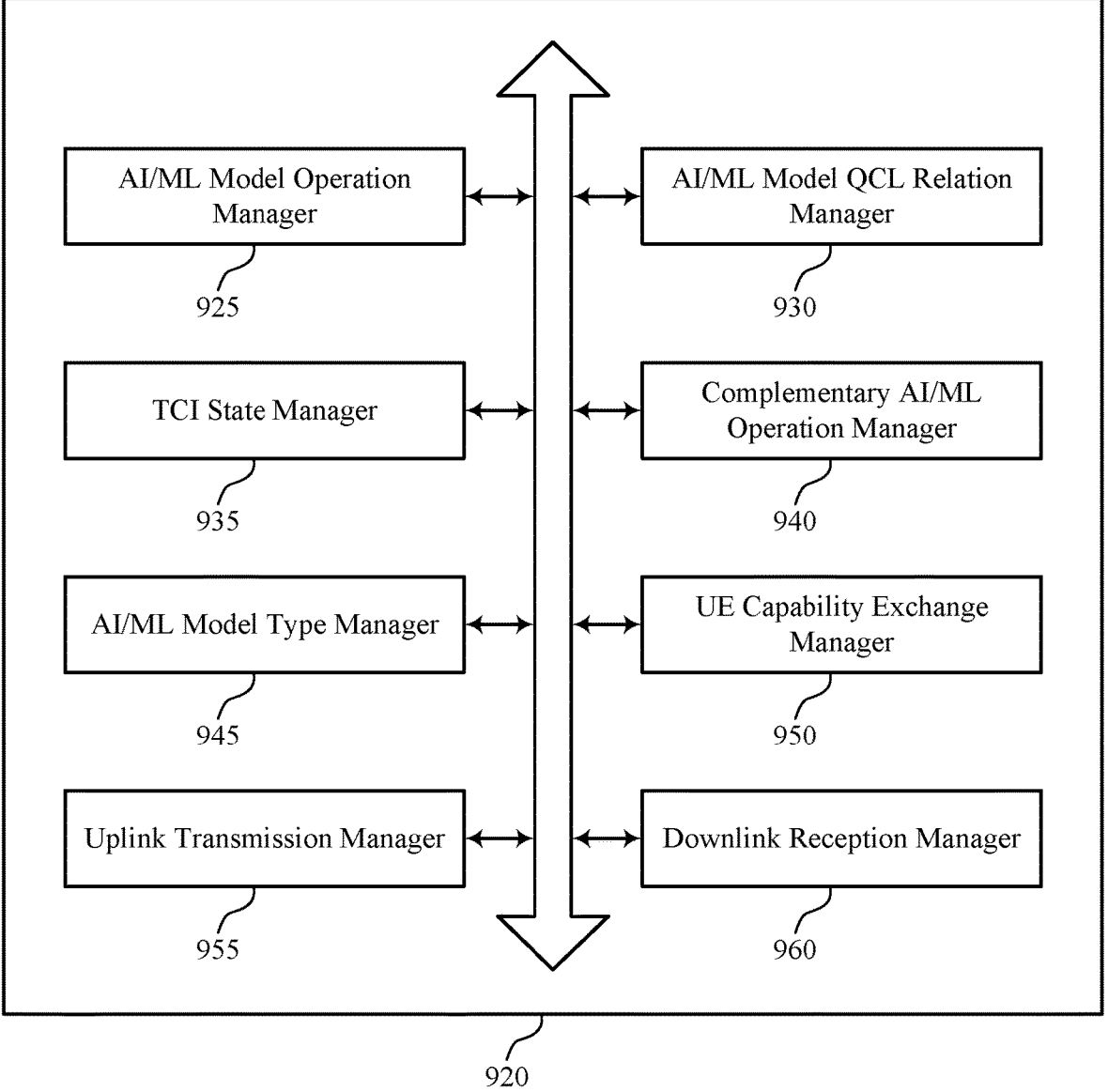
FIG. 9 shows a block diagram of a communications manager that supports QCL relation indication for AI or ML models in accordance with one or more aspects of the present disclosure.

FIG. 9 shows a block diagram 900 of a communications manager 920 that supports QCL relation indication for AI or ML models in accordance with one or more aspects of the present disclosure. The communications manager 920 may be an example of aspects of a communications manager 720, a communications manager 820, or both, as described herein. The communications manager 920, or various components thereof, may be an example of means for performing various aspects of QCL relation indication for AI or ML models as described herein. For example, the communications manager 920 may include an AI/ML model operation manager 925, an AI/ML model QCL relation manager 930, a TCI state manager 935, a complementary AI/ML operation manager 940, an AI/ML model type manager 945, a UE capability exchange manager 950, an uplink transmission manager 955, a downlink reception manager 960, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The AI/ML model operation manager 925 is capable of, configured to, or operable to support a means for communicating, with a network entity, a first message including an indication of operation of an AI or ML model at the UE or the network entity. The AI/ML model QCL relation manager 930 is capable of, configured to, or operable to support a means for communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

In some examples, the TCI state manager 935 is capable of, configured to, or operable to support a means for receiving an indication of a set of TCI states, where communicating the second message indicating the QCL relation includes communicating an indication of a TCI state of the set of TCI states that is associated with the AI or ML model.

In some examples, to support communicating the first message, the complementary AI/ML operation manager 940 is capable of, configured to, or operable to support a means for communicating an indication of a configuration including the operation of the AI or ML model at the UE and operation of a second AI or ML model at the network entity, where the second AI or ML model is complementary to the AI or ML model.

In some examples, to support communicating the first message, the AI/ML model type manager 945 is capable of, configured to, or operable to support a means for communicating an indication of a type of AI or ML model of the AI or ML model, where the QCL relation is based on the type of AI or ML model.

In some examples, to support communicating the second message, the UE capability exchange manager 950 is capable of, configured to, or operable to support a means for transmitting the second message via a UE capability exchange with the network entity.

In some examples, to support communicating the second message, the uplink transmission manager 955 is capable of, configured to, or operable to support a means for transmitting the second message via one of an uplink control channel transmission or an uplink shared channel transmission.

In some examples, to support communicating the second message, the downlink reception manager 960 is capable of, configured to, or operable to support a means for receiving the second message via RRC signaling, a downlink control channel transmission, a downlink shared channel transmission, or a MAC-CE.

In some examples, the reference signal is one of a synchronization signal block, a sounding reference signal, or a channel state information reference signal. In some examples, the physical channel is one of a broadcast channel, a downlink control channel, a downlink shared channel, an uplink control channel, or an uplink shared channel.

In some examples, to support communicating the first message and the second message, the AI/ML model operation manager 925 is capable of, configured to, or operable to support a means for communicating the first message and the second message is a same control message.

In some examples, to support communicating the first message and the second message, the AI/ML model operation manager 925 is capable of, configured to, or operable to support a means for communicating the first message via a first control message. In some examples, to support communicating the first message and the second message, the AI/ML model QCL relation manager 930 is capable of, configured to, or operable to support a means for communicating the second message via a second control message.

Figure 10:
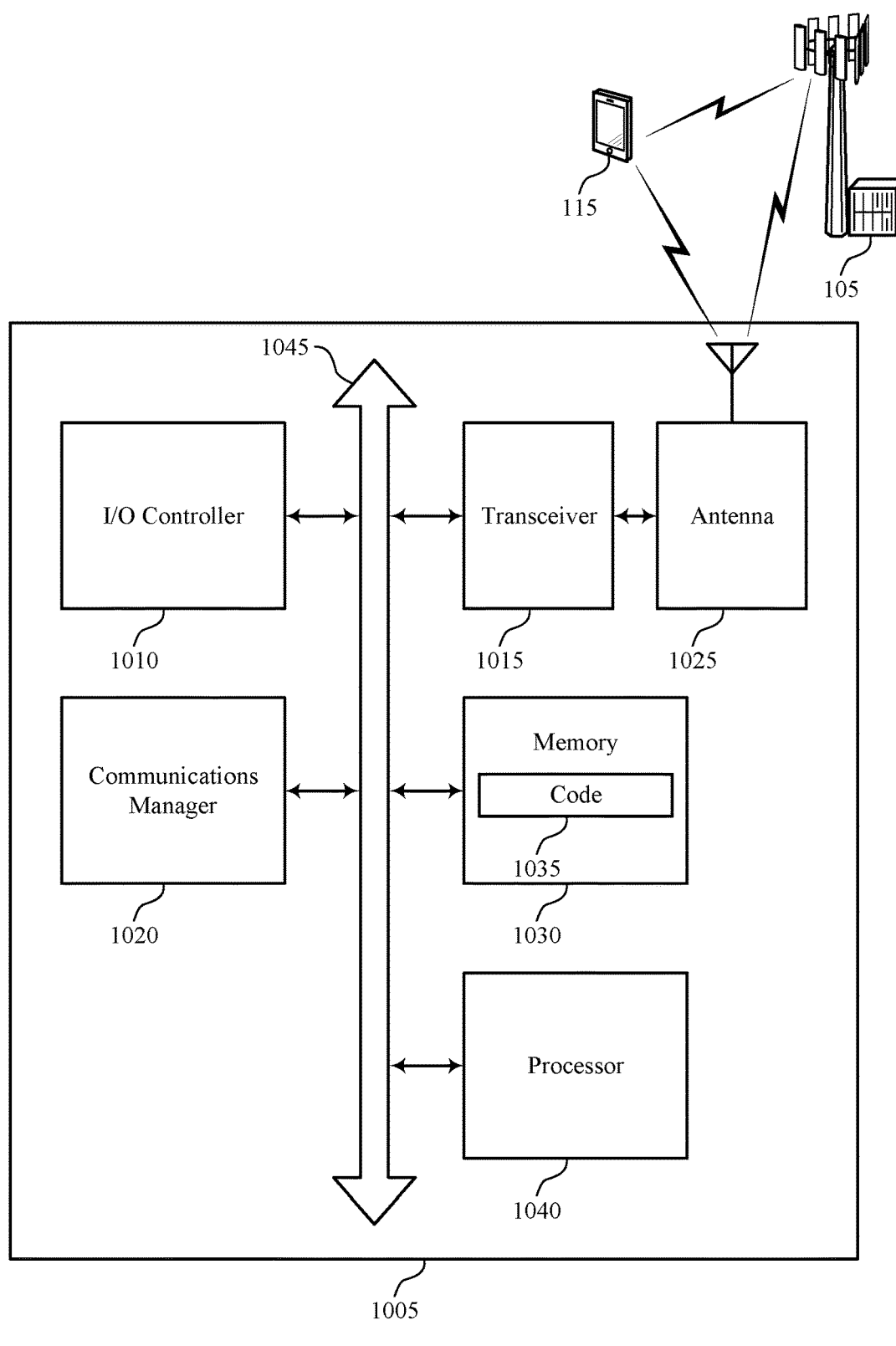
FIG. 10 shows a diagram of a system including a device that supports QCL relation indication for AI or ML models in accordance with one or more aspects of the present disclosure.

FIG. 10 shows a diagram of a system 1000 including a device 1005 that supports QCL relation indication for AI or ML models in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting QCL relation indication for AI or ML models). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein.

The communications manager 1020 may support wireless communications in accordance with examples as disclosed herein. For example, the communications manager 1020 is capable of, configured to, or operable to support a means for communicating, with a network entity, a first message including an indication of operation of an AI or ML model at the UE or the network entity. The communications manager 1020 is capable of, configured to, or operable to support a means for communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

By including or configuring the communications manager 1020 in accordance with examples as described herein, the device 1005 may support techniques for improved communication reliability, more efficient utilization of communication resources, improved coordination between devices, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of QCL relation indication for AI or ML models as described herein, or the at least one processor 1040 and the at least one memory 1030 may be otherwise configured to, individually or collectively, perform or support such operations.

Figure 11:
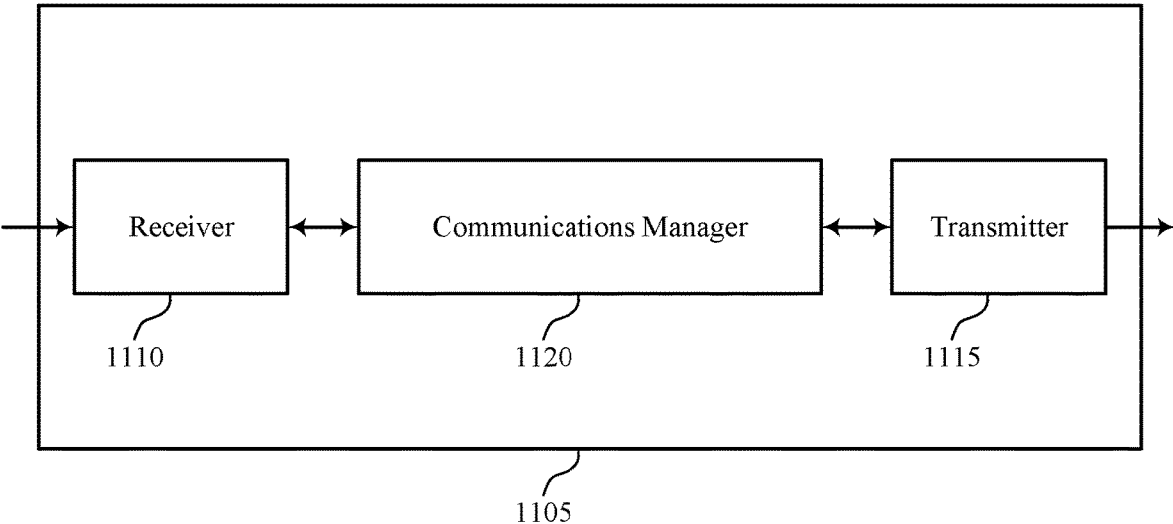
FIGS. 11 and 12 show block diagrams of devices that support QCL relation indication for AI or ML models in accordance with one or more aspects of the present disclosure.

FIG. 11 shows a block diagram 1100 of a device 1105 that supports QCL relation indication for AI or ML models in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of QCL relation indication for AI or ML models as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for communicating, with a UE, a first message including an indication of operation of an AI or ML model at the UE or the network entity. The communications manager 1120 is capable of, configured to, or operable to support a means for communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for more efficient utilization of communication resources.

Figure 12:
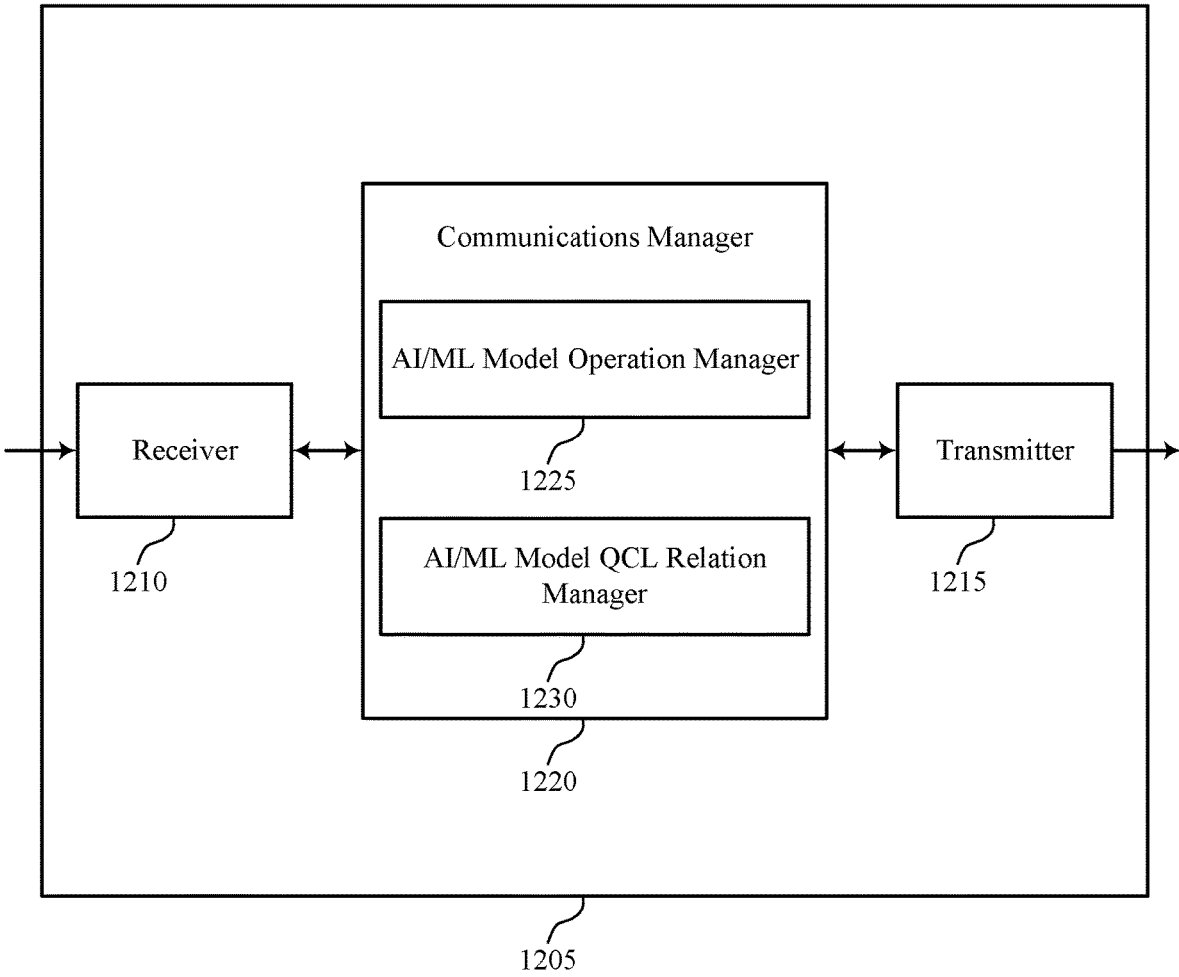
Figure 12:

FIG. 12 shows a block diagram 1200 of a device 1205 that supports QCL relation indication for AI or ML models in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of QCL relation indication for AI or ML models as described herein. For example, the communications manager 1220 may include an AI/ML model operation manager 1225 an AI/ML model QCL relation manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The AI/ML model operation manager 1225 is capable of, configured to, or operable to support a means for communicating, with a UE, a first message including an indication of operation of an AI or ML model at the UE or the network entity. The AI/ML model QCL relation manager 1230 is capable of, configured to, or operable to support a means for communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Figure 13:
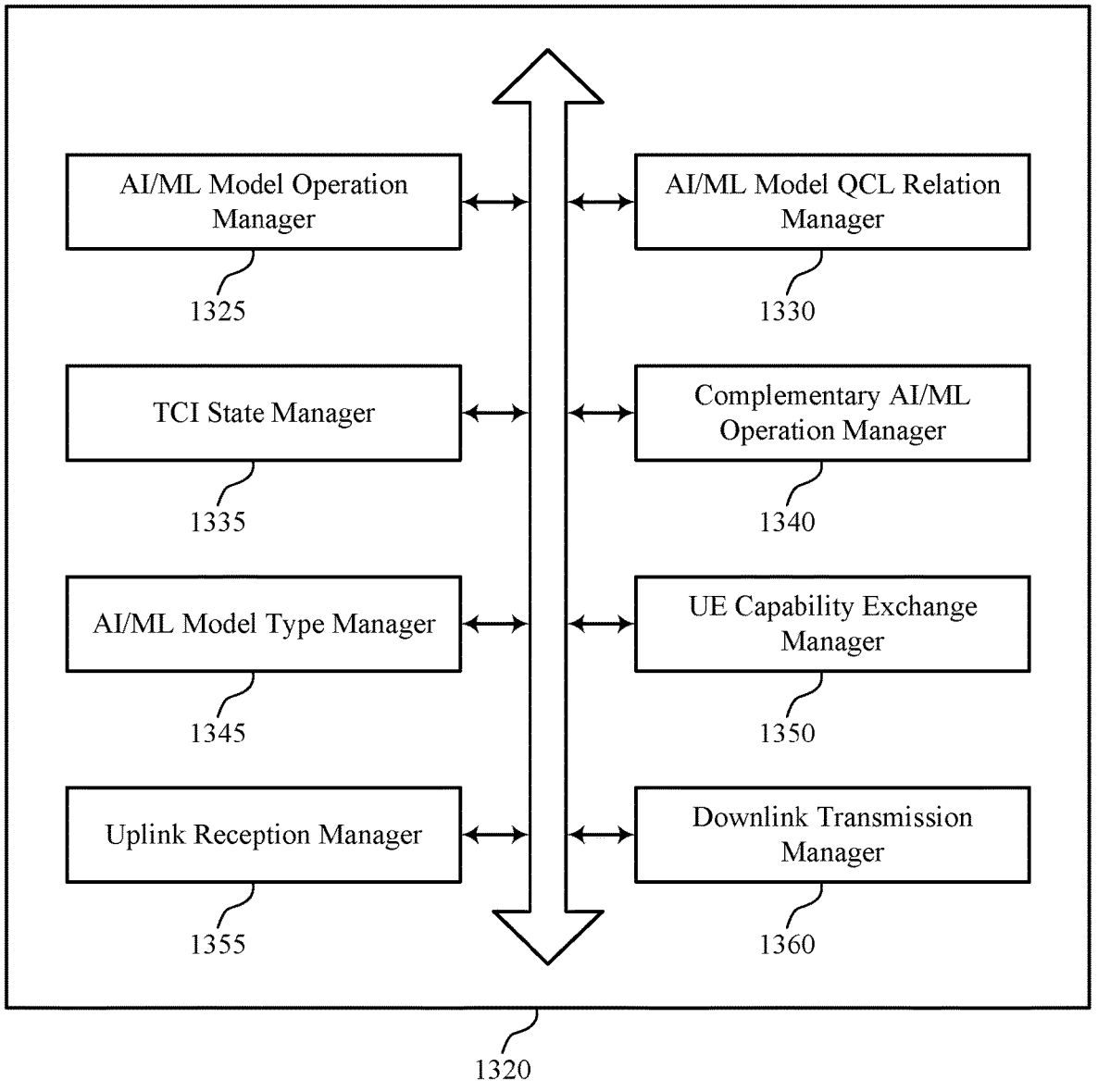
FIG. 13 shows a block diagram of a communications manager that supports QCL relation indication for AI or ML models in accordance with one or more aspects of the present disclosure.

FIG. 13 shows a block diagram 1300 of a communications manager 1320 that supports QCL relation indication for AI or ML models in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of QCL relation indication for AI or ML models as described herein. For example, the communications manager 1320 may include an AI/ML model operation manager 1325, an AI/ML model QCL relation manager 1330, a TCI state manager 1335, a complementary AI/ML operation manager 1340, an AI/ML model type manager 1345, a UE capability exchange manager

1350, an uplink reception manager 1355, a downlink transmission manager 1360, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The AI/ML model operation manager 1325 is capable of, configured to, or operable to support a means for communicating, with a UE, a first message including an indication of operation of an AI or ML model at the UE or the network entity. The AI/ML model QCL relation manager 1330 is capable of, configured to, or operable to support a means for communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

In some examples, the TCI state manager 1335 is capable of, configured to, or operable to support a means for transmitting an indication of a set of TCI states, where communicating the second message indicating the QCL relation includes communicating an indication of a TCI state of the set of TCI states that is associated with the AI or ML model.

In some examples, to support communicating the first message, the complementary AI/ML operation manager 1340 is capable of, configured to, or operable to support a means for communicating an indication of a configuration including the operation of the AI or ML model at the UE and operation of a second AI or ML model at the network entity, where the second AI or ML model is complementary to the AI or ML model.

In some examples, to support communicating the first message, the AI/ML model type manager 1345 is capable of, configured to, or operable to support a means for communicating an indication of a type of AI or ML model of the AI or ML model, where the QCL relation is based on the type of AI or ML model.

In some examples, to support communicating the second message, the UE capability exchange manager 1350 is capable of, configured to, or operable to support a means for receiving the second message via a UE capability exchange with the UE.

In some examples, to support communicating the second message, the uplink reception manager 1355 is capable of, configured to, or operable to support a means for receiving the second message via one of an uplink control channel transmission or an uplink shared channel transmission.

In some examples, to support communicating the second message, the downlink transmission manager 1360 is capable of, configured to, or operable to support a means for transmitting the second message via RRC signaling, a downlink control channel transmission, a downlink shared channel transmission, or a MAC-CE.

In some examples, the reference signal is one of a synchronization signal block, a sounding reference signal, or a channel state information reference signal. In some examples, the physical channel is one of a broadcast channel, a downlink control channel, a downlink shared channel, an uplink control channel, or an uplink shared channel.

In some examples, to support communicating the first message and the second message, the AI/ML model operation manager 1325 is capable of, configured to, or operable to support a means for communicating the first message and the second message is a same control message.

In some examples, to support communicating the first message and the second message, the AI/ML model operation manager 1325 is capable of, configured to, or operable to support a means for communicating the first message via a first control message. In some examples, to support communicating the first message and the second message, the AI/ML model QCL relation manager 1330 is capable of, configured to, or operable to support a means for communicating the second message via a second control message.

Figure 14:
FIG. 14 shows a diagram of a system including a device that supports QCL relation indication for AI or ML models in accordance with one or more aspects of the present disclosure.

FIG. 14 shows a diagram of a system 1400 including a device 1405 that supports QCL relation indication for AI or ML models in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting QCL relation indication for AI or ML models). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405).

For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for communicating, with a UE, a first message including an indication of operation of an AI or ML model at the UE or the network entity. The communications manager 1420 is capable of, configured to, or operable to support a means for communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

By including or configuring the communications manager 1420 in accordance with examples as described herein, the device 1405 may support techniques for improved communication reliability, more efficient utilization of communication resources, improved coordination between devices, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of QCL relation indication for AI or ML models as described herein, or the at least one processor 1435 and the at least one memory 1425 may be otherwise configured to, individually or collectively, perform or support such operations.

FIG. 15 shows a flowchart illustrating a method 1500 that supports QCL relation indication for AI or ML models in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include communicating, with a network entity, a first message including an indication of operation of an AI or ML model at the UE or the network entity. The operations of block 1505 may be performed in accordance with examples as disclosed herein. In some examples, aspects of the operations of 1505 may be performed by an AI/ML model operation manager 925 as described with reference to FIG. 9.

At 1510, the method may include communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE. The operations of block 1510 may be performed in accordance with examples as disclosed herein. In some examples, aspects of the operations of 1510 may be performed by an AI/ML model QCL relation manager 930 as described with reference to FIG. 9.

FIG. 16 shows a flowchart illustrating a method 1600 that supports QCL relation indication for AI or ML models in accordance with aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include communicating, with a UE, a first message including an indication of operation of an AI or ML model at the UE or the network entity. The operations of block 1605 may be performed in accordance with examples as disclosed herein. In some examples, aspects of the operations of 1605 may be performed by an AI/ML model operation manager 1325 as described with reference to FIG. 13.

At 1610, the method may include communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE. The operations of block 1610 may be performed in accordance with examples as disclosed herein. In some examples, aspects of the operations of 1610 may be performed by an AI/ML model QCL relation manager 1330 as described with reference to FIG. 13.

The following provides an overview of aspects of the present disclosure:

Aspect 1: A method for wireless communications at a UE, comprising: communicating, with a network entity, a first message including an indication of operation of an AI or ML model at the UE or the network entity; and communicating, with the network entity and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Aspect 2: The method of aspect 1, further comprising: receiving an indication of a set of TCI states, wherein communicating the second message indicating the QCL relation comprises communicating an indication of a TCI state of the set of TCI states that is associated with the AI or ML model.

Aspect 3: The method of any of aspects 1 through 2, wherein communicating the first message comprises: communicating an indication of a configuration comprising the operation of the AI or ML model at the UE and operation of a second AI or ML model at the network entity, wherein the second AI or ML model is complementary to the AI or ML model.

Aspect 4: The method of any of aspects 1 through 3, wherein communicating the first message comprises: communicating an indication of a type of AI or ML model of the AI or ML model, wherein the QCL relation is based at least in part on the type of AI or ML model.

Aspect 5: The method of any of aspects 1 through 4, wherein communicating the second message comprises: transmitting the second message via a UE capability exchange with the network entity.

Aspect 6: The method of any of aspects 1 through 4, wherein communicating the second message comprises: transmitting the second message via one of an uplink control channel transmission or an uplink shared channel transmission.

Aspect 7: The method of any of aspects 1 through 4, wherein communicating the second message comprises: receiving the second message via radio resource control signaling, a downlink control channel transmission, a downlink shared channel transmission, or a MAC-CE.

Aspect 8: The method of any of aspects 1 through 7, wherein the reference signal is one of an SSB, an SRS, or a CSI-RS, or the physical channel is one of a broadcast channel, a downlink control channel, a downlink shared channel, an uplink control channel, or an uplink shared channel.

Aspect 9: The method of any of aspects 1 through 8, wherein communicating the first message and the second message comprises: communicating the first message and the second message is a same control message.

Aspect 10: The method of any of aspects 1 through 8, wherein communicating the first message and the second message comprises: communicating the first message via a first control message; and communicating the second message via a second control message.

Aspect 11: A method for wireless communications at a network entity, comprising: communicating, with a UE, a first message including an indication of operation of an AI or ML model at the UE or the network entity; and communicating, with the UE and based on the indication of the operation of the operation of the AI or ML model at the UE or the network entity, a second message including an indication of a QCL relation between the AI or ML model and at least one of a reference signal communicated by the UE, a physical channel communicated by the UE, an antenna port of the network entity, or an antenna port of the UE.

Aspect 12: The method of aspect 11, further comprising: transmitting an indication of a set of TCI states, wherein communicating the second message indicating the QCL relation comprises communicating an indication of a TCI state of the set of TCI states that is associated with the AI or ML model.

Aspect 13: The method of any of aspects 11 through 12, wherein communicating the first message comprises: communicating an indication of a configuration comprising the operation of the AI or ML model at the UE and operation of a second AI or ML model at the network entity, wherein the second AI or ML model is complementary to the AI or ML model.

Aspect 14: The method of any of aspects 11 through 13, wherein communicating the first message comprises: communicating an indication of a type of AI or ML model of the AI or ML model, wherein the QCL relation is based at least in part on the type of AI or ML model.

Aspect 15: The method of any of aspects 11 through 14, wherein communicating the second message comprises: receiving the second message via a UE capability exchange with the UE.

Aspect 16: The method of any of aspects 11 through 14, wherein communicating the second message comprises:

receiving the second message via one of an uplink control channel transmission or an uplink shared channel transmission.

Aspect 17: The method of any of aspects 11 through 14, wherein communicating the second message comprises: transmitting the second message via radio resource control signaling, a downlink control channel transmission, a downlink shared channel transmission, or a MAC-CE.

Aspect 18: The method of any of aspects 11 through 17, wherein the reference signal is one of a an SSB, an SRS, or a CSI-RS, or the physical channel is one of a broadcast channel, a downlink control channel, a downlink shared channel, an uplink control channel, or an uplink shared channel.

Aspect 19: The method of any of aspects 11 through 18, wherein communicating the first message and the second message comprises: communicating the first message and the second message is a same control message.

Aspect 20: The method of any of aspects 11 through 18, wherein communicating the first message and the second message comprises: communicating the first message via a first control message; and communicating the second message via a second control message.

Aspect 21: A UE for wireless communications, comprising one or more memories storing processor-executable code, and one or more processors coupled with the one or more memories and individually or collectively operable to execute the code to cause the UE to perform a method of any of aspects 1 through 10.

Aspect 22: A UE for wireless communications, comprising at least one means for performing a method of any of aspects 1 through 10.

Aspect 23: A non-transitory computer-readable medium storing code for wireless communications, the code comprising instructions executable by a processor to perform a method of any of aspects 1 through 10.

Aspect 24: A network entity for wireless communications, comprising one or more memories storing processor-executable code, and one or more processors coupled with the one or more memories and individually or collectively operable to execute the code to cause the network entity to perform a method of any of aspects 11 through 20.

Aspect 25: A network entity for wireless communications, comprising at least one means for performing a method of any of aspects 11 through 20.

Aspect 26: A non-transitory computer-readable medium storing code for wireless communications, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
communicate, with a network entity, a first message including an indication of operation of an artificial intelligence or machine learning model at the UE or the network entity; and
communicate, with the network entity and based on the indication of the operation of the operation of the artificial intelligence or machine learning model at the UE or the network entity, a second message including an indication of a quasi co-location relation between the artificial intelligence or machine learning model and at least one of a reference signal communicated by the UE, a physical channel communicated by the UE, an antenna port of the network entity, or an antenna port of the UE.

2. The UE of claim 1, wherein the one or more processors are individually or collectively further operable to execute the code to cause the UE to:
receive an indication of a set of transmission configuration indicator states, wherein communicating the second message indicating the quasi co-location relation comprises communicating an indication of a transmission configuration indicator state of the set of transmission configuration indicator states that is associated with the artificial intelligence or machine learning model.

3. The UE of claim 1, wherein, to communicate the first message, the one or more processors are individually or collectively operable to execute the code to cause the UE to:
communicate an indication of a configuration comprising the operation of the artificial intelligence or machine learning model at the UE and operation of a second artificial intelligence or machine learning model at the network entity, wherein the second artificial intelligence or machine learning model is complementary to the artificial intelligence or machine learning model.

4. The UE of claim 1, wherein, to communicate the first message, the one or more processors are individually or collectively operable to execute the code to cause the UE to:

communicate an indication of a type of artificial intelligence or machine learning model of the artificial intelligence or machine learning model, wherein the quasi co-location relation is based at least in part on the type of artificial intelligence or machine learning model.

5. The UE of claim 1, wherein, to communicate the second message, the one or more processors are individually or collectively operable to execute the code to cause the UE to:

transmit the second message via a UE capability exchange with the network entity.

6. The UE of claim 1, wherein, to communicate the second message, the one or more processors are individually or collectively operable to execute the code to cause the UE to:

transmit the second message via one of an uplink control channel transmission or an uplink shared channel transmission.

7. The UE of claim 1, wherein, to communicate the second message, the one or more processors are individually or collectively operable to execute the code to cause the UE to:

receive the second message via radio resource control signaling, a downlink control channel transmission, a downlink shared channel transmission, or a medium access control (MAC) control element.

8. The UE of claim 1, wherein:

the reference signal is one of a synchronization signal block, a sounding reference signal, or a channel state information reference signal, or the physical channel is one of a broadcast channel, a downlink control channel, a downlink shared channel, an uplink control channel, or an uplink shared channel.

9. The UE of claim 1, wherein, to communicate the first message and the second message, the one or more processors are individually or collectively operable to execute the code to cause the UE to:

communicate the first message and the second message is a same control message.

10. The UE of claim 1, wherein, to communicate the first message and the second message, the one or more processors are individually or collectively operable to execute the code to cause the UE to:

communicate the first message via a first control message; and communicate the second message via a second control message.

11. A network entity, comprising:

one or more memories storing processor-executable code; and one or more processors coupled with the one or more memories and individually or collectively operable to execute the code to cause the network entity to:

communicate, with a user equipment (UE), a first message including an indication of operation of an artificial intelligence or machine learning model at the UE or the network entity; and communicate, with the UE and based on the indication of the operation of the operation of the artificial intelligence or machine learning model at the UE or the network entity, a second message including an indication of a quasi co-location relation between the artificial intelligence or machine learning model and at least one of a reference signal communicated by the UE, a physical channel communicated by the UE, an antenna port of the network entity, or an antenna port of the UE.

12. The network entity of claim 11, wherein the one or more processors are individually or collectively further operable to execute the code to cause the network entity to:

transmit an indication of a set of transmission configuration indicator states, wherein communicating the second message indicating the quasi co-location relation comprises communicating an indication of a transmission configuration indicator state of the set of transmission configuration indicator states that is associated with the artificial intelligence or machine learning model.

13. The network entity of claim 11, wherein, to communicate the first message, the one or more processors are individually or collectively operable to execute the code to cause the network entity to:

communicate an indication of a configuration comprising the operation of the artificial intelligence or machine learning model at the UE and operation of a second artificial intelligence or machine learning model at the network entity, wherein the second artificial intelligence or machine learning model is complementary to the artificial intelligence or machine learning model.

14. The network entity of claim 11, wherein, to communicate the first message, the one or more processors are individually or collectively operable to execute the code to cause the network entity to:

communicate an indication of a type of artificial intelligence or machine learning model of the artificial intelligence or machine learning model, wherein the quasi co-location relation is based at least in part on the type of artificial intelligence or machine learning model.

15. The network entity of claim 11, wherein, to communicate the second message, the one or more processors are individually or collectively operable to execute the code to cause the network entity to:

receive the second message via a UE capability exchange with the UE.

16. The network entity of claim 11, wherein, to communicate the second message, the one or more processors are individually or collectively operable to execute the code to cause the network entity to:

receive the second message via one of an uplink control channel transmission or an uplink shared channel transmission.

17. The network entity of claim 11, wherein, to communicate the second message, the one or more processors are individually or collectively operable to execute the code to cause the network entity to:

transmit the second message via radio resource control signaling, a downlink control channel transmission, a downlink shared channel transmission, or a medium access control (MAC) control element.

18. The network entity of claim 11, wherein:

the reference signal is one of a synchronization signal block, a sounding reference signal, or a channel state information reference signal, or the physical channel is one of a broadcast channel, a downlink control channel, a downlink shared channel, an uplink control channel, or an uplink shared channel.

19. The network entity of claim 11, wherein, to communicate the first message and the second message, the one or more processors are individually or collectively operable to execute the code to cause the network entity to:

communicate the first message and the second message is a same control message.

20. The network entity of claim 11, wherein, to communicate the first message and the second message, the one or more processors are individually or collectively operable to execute the code to cause the network entity to:

communicate the first message via a first control message; and communicate the second message via a second control message.

21. A method for wireless communications at a user equipment (UE), comprising:

communicating, with a network entity, a first message including an indication of operation of an artificial intelligence or machine learning model at the UE or the network entity; and communicating, with the network entity and based on the indication of the operation of the operation of the artificial intelligence or machine learning model at the UE or the network entity, a second message including an indication of a quasi co-location relation between the artificial intelligence or machine learning model and at least one of a reference signal communicated by the UE, a physical channel communicated by the UE, an antenna port of the network entity, or an antenna port of the UE.

22. The method of claim 21, further comprising:

receiving an indication of a set of transmission configuration indicator states, wherein communicating the second message indicating the quasi co-location relation comprises communicating an indication of a transmission configuration indicator state of the set of transmission configuration indicator states that is associated with the artificial intelligence or machine learning model.

23. The method of claim 21, wherein communicating the first message comprises:

communicating an indication of a configuration comprising the operation of the artificial intelligence or machine learning model at the UE and operation of a second artificial intelligence or machine learning model at the network entity, wherein the second artificial intelligence or machine learning model is complementary to the artificial intelligence or machine learning model.

24. The method of claim 21, wherein communicating the first message comprises:

communicating an indication of a type of artificial intelligence or machine learning model of the artificial intelligence or machine learning model, wherein the quasi co-location relation is based at least in part on the type of artificial intelligence or machine learning model.

25. The method of claim 21, wherein communicating the second message comprises:

transmitting the second message via a UE capability exchange with the network entity.

26. The method of claim 21, wherein communicating the second message comprises:

transmitting the second message via one of an uplink control channel transmission or an uplink shared channel transmission.

27. The method of claim 21, wherein communicating the second message comprises:

receiving the second message via radio resource control signaling, a downlink control channel transmission, a downlink shared channel transmission, or a medium access control (MAC) control element.

28. The method of claim 21, wherein:

the reference signal is one of a synchronization signal block, a sounding reference signal, or a channel state information reference signal, or the physical channel is one of a broadcast channel, a downlink control channel, a downlink shared channel, an uplink control channel, or an uplink shared channel.

29. The method of claim 21, wherein communicating the first message and the second message comprises:

communicating the first message and the second message is a same control message.

30. A method for wireless communications at a network entity, comprising:

communicating, with a user equipment (UE), a first message including an indication of operation of an artificial intelligence or machine learning model at the UE or the network entity; and communicating, with the UE and based on the indication of the operation of the operation of the artificial intelligence or machine learning model at the UE or the network entity, a second message including an indication of a quasi co-location relation between the artificial intelligence or machine learning model and at least one of a reference signal communicated by the UE, a physical channel communicated by the UE, an antenna port of the network entity, or an antenna port of the UE.

* * * * *